(12) United States Patent
Toulson

(10) Patent No.: US 11,790,801 B2
(45) Date of Patent: Oct. 17, 2023

(54) EVALUATING PERCUSSIVE PERFORMANCES

(71) Applicant: RT Sixty Ltd., London (GB)

(72) Inventor: Edwin Robert Toulson, London (GB)

(73) Assignee: RT Sixty Ltd, London (GB)

( * ) Notice: Subject to any disclaimer, the term of this patent is extended or adjusted under 35 U.S.C. 154(b) by 131 days.

(21) Appl. No.: 17/368,594

(22) Filed: Jul. 6, 2021

(65) Prior Publication Data

US 2022/0028295 A1    Jan. 27, 2022

(30) Foreign Application Priority Data

Jul. 21, 2020  (GB) .................................... 2011295

(51) Int. Cl.
| | | |
|---|---|---|
| G09B 15/02 | (2006.01) | |
| H04R 5/027 | (2006.01) | |
| G10L 25/18 | (2013.01) | |
| G10H 1/00 | (2006.01) | |
| G06Q 50/00 | (2012.01) | |
| G06N 20/00 | (2019.01) | |
| G06Q 10/101 | (2023.01) | |

(52) U.S. Cl.
CPC ......... G09B 15/023 (2013.01); G10H 1/0008 (2013.01); G10L 25/18 (2013.01); H04R 5/027 (2013.01); *G06N 20/00* (2019.01); *G06Q 10/101* (2013.01); *G06Q 50/01* (2013.01); *G10H 2210/051* (2013.01); *G10H 2210/091* (2013.01)

(58) Field of Classification Search
CPC .............. G09B 15/023; G10H 1/0008; G10H 2210/051; G10H 2210/091; G10L 25/18
See application file for complete search history.

(56) References Cited

U.S. PATENT DOCUMENTS

| | | | |
|---|---|---|---|
| 7,667,130 B2 | 2/2010 | Mishima | |
| 8,629,342 B2 * | 1/2014 | Lee ......................... | G10H 3/186 |
| | | | 84/610 |
| 8,969,699 B2 * | 3/2015 | Tabata ................. | G10H 1/0008 |
| | | | 84/609 |
| 9,218,748 B2 * | 12/2015 | Kaipainen ................ | G09B 5/06 |
| 9,333,418 B2 * | 5/2016 | Lee ....................... | G10H 1/0016 |
| 9,536,509 B2 * | 1/2017 | Esparza ................. | G10H 3/146 |

(Continued)

FOREIGN PATENT DOCUMENTS

| | | |
|---|---|---|
| CN | 206115774 U | 4/2019 |
| CN | 110444182 A | 11/2019 |

(Continued)

*Primary Examiner* — Robert W Horn
(74) *Attorney, Agent, or Firm* — EIP US LLP

(57) ABSTRACT

Measures (for example, methods, systems and computer programs) are provided to evaluate a percussive performance. Percussive performance data captured by one or more sensors is received. The percussive performance data represents one or more impact waveforms of one or more hits on a performance surface. The one or more impact waveforms are analysed. The analysing comprises: (i) identifying one or more characteristics of the one or more impact waveforms; (ii) classifying the one or more hits as one or more percussive hit-types based on the one or more characteristics; and (iii) evaluating the one or more percussive hit-types against performance target data. Performance evaluation data is output based on said evaluating.

20 Claims, 16 Drawing Sheets

(56) References Cited

U.S. PATENT DOCUMENTS

| | | | |
|---|---|---|---|
| 9,805,703 B2* | 10/2017 | Esparza | G10H 1/14 |
| 10,102,835 B1* | 10/2018 | Shah | G06F 3/011 |
| 10,775,941 B2* | 9/2020 | Heath | G10H 1/0008 |
| 10,978,033 B2* | 4/2021 | Lathrop | G10G 1/02 |
| 11,450,227 B2* | 9/2022 | Wells | G04F 5/025 |
| 2006/0011050 A1 | 1/2006 | Arimoto | |
| 2013/0247747 A1 | 9/2013 | Yamada | |
| 2014/0260916 A1* | 9/2014 | Oppel | G10H 1/0016 84/626 |
| 2016/0093278 A1 | 3/2016 | Esparza | |
| 2018/0122260 A1* | 5/2018 | Walder | G09B 15/023 |
| 2022/0028295 A1* | 1/2022 | Toulson | G10L 25/18 |

FOREIGN PATENT DOCUMENTS

| | | | |
|---|---|---|---|
| JP | H08106247 A | 4/1996 | |
| JP | H096361 A | 1/1997 | |
| WO | WO-2006090528 A1 * | 8/2006 | G06T 11/001 |
| WO | 2014082986 A1 | 6/2014 | |

* cited by examiner

EVALUATING PERCUSSIVE PERFORMANCES

CROSS-REFERENCE TO RELATED APPLICATIONS

This application claims priority to GB Application No. 2011295.9, filed Jul. 21, 2020, under 35 U.S.C. § 119(a). Each of the above-referenced patent applications is incorporated by reference in its entirety.

BACKGROUND OF THE INVENTION

Technical Field

The present invention relates to evaluating percussive performances.

Description of the Related Technology

Percussive performers, such as drummers, strive to improve their performance accuracy and technique. By evaluating their percussive performances, they can identify strengths and weaknesses and, hence, areas for improvement.

US 2013/0247747 A1 relates to an electronic percussion instrument set and musical performance evaluation apparatus. Each of a plurality of pads is assigned a tone colour of a different musical instrument and has a surface which a player strikes. A controller having a central processing unit (CPU) identifies a pad in the plurality of pads which is struck by the player. The controller has a tone generator for generating musical tones of a musical instrument assigned to the identified pad. The CPU evaluates the player's performance and scores the performance. More specifically, the CPU awards an amount of points when first and second, different pads are struck in a sequence. A display unit for displaying the awarded score is also provided.

US 2014/0260916 A1 relates to an electronic percussion device for determining separate right- and left-hand actions. The percussion device allows a percussionist to learn, through electronic feedback, correct right- or left-hand playing. The percussion device can be struck by the percussion player on the right or left side of a pad. Alternatively, the percussion device can connect to a visual detector to detect motions of the player's left and right hands. Computer software may display written music or instructions of which hand the player should play with and at what time they should play. The percussion device inputs the performance of the percussionist into a computer, designating which inputs were from the right-hand side and which inputs were from the left-hand side. Optionally, foot sensors can be used to detect movement of the left and right feet to assist in teaching of instruments such as a drum set where the feet may control operation of instruments such as a bass drum and hi-hat.

Such electronic systems provide some evaluation of a percussive performance.

SUMMARY

According to first embodiments, there is provided a method of evaluating a percussive performance, the method comprising:

receiving percussive performance data captured by one or more sensors, the percussive performance data representing one or more impact waveforms of one or more hits on a performance surface;

analysing the one or more impact waveforms, wherein the analysing comprises:

identifying one or more characteristics of the one or more impact waveforms;

classifying the one or more hits as one or more percussive hit-types based on the one or more characteristics; and evaluating the one or more percussive hit-types against performance target data; and outputting performance evaluation data based on said evaluating.

According to second embodiments, there is provided a system configured to perform a method according to the first embodiments.

According to third embodiments, there is provided a computer program arranged to perform a method according to the first embodiments.

Further features will become apparent from the following description, given by way of example only, which is made with reference to the accompanying drawings.

DETAILED DESCRIPTION OF CERTAIN INVENTIVE EMBODIMENTS

Figure 1:
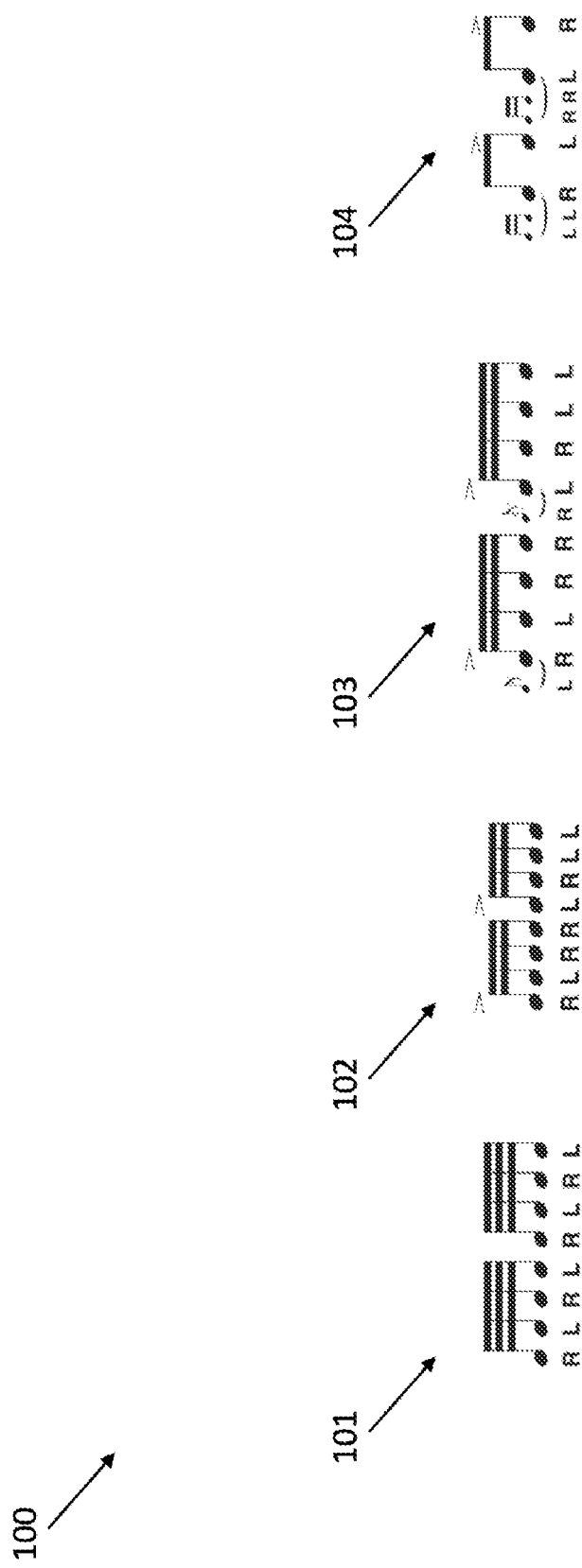
FIG. 1 shows a diagram illustrating an example set of drum rudiments and drumstick control exercises using notation of the Percussive Arts Society International Drum Rudiments.

Examples described herein provide more comprehensive evaluation of percussive performances than existing systems which, for example, do not perform hit-type classification. Such evaluation may be more comprehensive in terms of the number of aspects of a performance that are evaluated and/or the level of detail to which aspects of the performance are evaluated. Examples described herein evaluate aspects of performances that are not, and cannot be, evaluated in existing systems. For example, signal analysis methods described herein may be used to: (i) evaluate relative stick timing of drumstick hits, from a left or right hand, with or without reference to a datum metronome click; (ii) classify ghost notes and/or accent drumstick hits for each hand and evaluate them against a prescribed accented and/or ghost note drum pattern; (iii) measure a contact time of one or more drumstick hits and, hence, a measure of "stick bounce"; (iv) classify and evaluate flam, drag, ruff and buzz drumstick hit types, and/or and any other form of unique drumstick hit type; (v) calculate one or more user scores, for example as percentages, and/or one or more other metrics for consistency and/or accuracy with regards to timing; (vi) calculate one or more performance accuracy scores with respect to dynamics and/or hit-type classification; and (vii) identify and communicate areas for improvement of performance technique.

Examples described herein provide enhanced functionality with respect to the Drummer ITP™ software application (release version 1.10, launched on 25 May 2020), available from RT60 Ltd. Examples of such enhanced functionality include, but are not limited to, (i) classifying one or more hits as one or more percussive hit-types based on one or more identified characteristics of one or more impact waveforms of the one or more hits, and (ii) evaluating the identified one or more characteristics and the one or more percussive hit-types against performance target data.

Examples described herein relate to evaluating a percussive performance (which may also be referred to as a "percussion performance") in which percussive performance data represents one or more impact waveforms of one or more hits on a performance surface. For convenience and brevity, specific examples will be described in which the percussive performance is a drumming performance, and in which the one or more hits on the performance surface include one or more drumstick hits caused by a drummer using a pair of drumsticks (which may be referred to simply as "sticks") on a drumstick practice pad. Other examples of percussive performances, hits, performance surfaces, performers and impacting members will, however, be described. As such, unless the context indicates otherwise, specific examples described in the context of a drumming performance should be understood to be applicable to any type of percussive performance using any type of impacting member on any type of performance surface.

Drummers regularly use drumstick practice pads (which may be referred to simply as "practice pads") along with an audible metronome to practice and develop their drumstick performance accuracy and technique. A practice pad is a passive and quiet device that provides an impact response and elasticity similar to a tensioned drumhead. Drummers can practice a number of stick rudiments and exercises with the practice pad. Examples of such rudiments and exercises include, but are not limited to, single stroke drum rolls, double stroke drum rolls, accented patterns, paradiddles, flam patterns and drag patterns. Drummers can also practice other reversed, inverted, offset and/or bespoke exercises. Such exercises involve stick control, with drumsticks held in both the left and right hands. Exercise patterns can be practiced with and without dynamic accents on certain notes, can be left- or right-hand-led, can be offset to start on different beats of a pattern, and/or can be practiced with different music time signatures and/or at different tempos. Fast tempos involve a different hand technique from slower tempos.

Referring to FIG. 1, there is shown an example set 100 of drum rudiments and stick control exercises using notation of the Percussive Arts Society International Drum Rudiments. The example set 100 includes a single stroke roll 101, a single paradiddle 102, a flam paradiddle 103 and a single drag tap 104.

Figure 2:
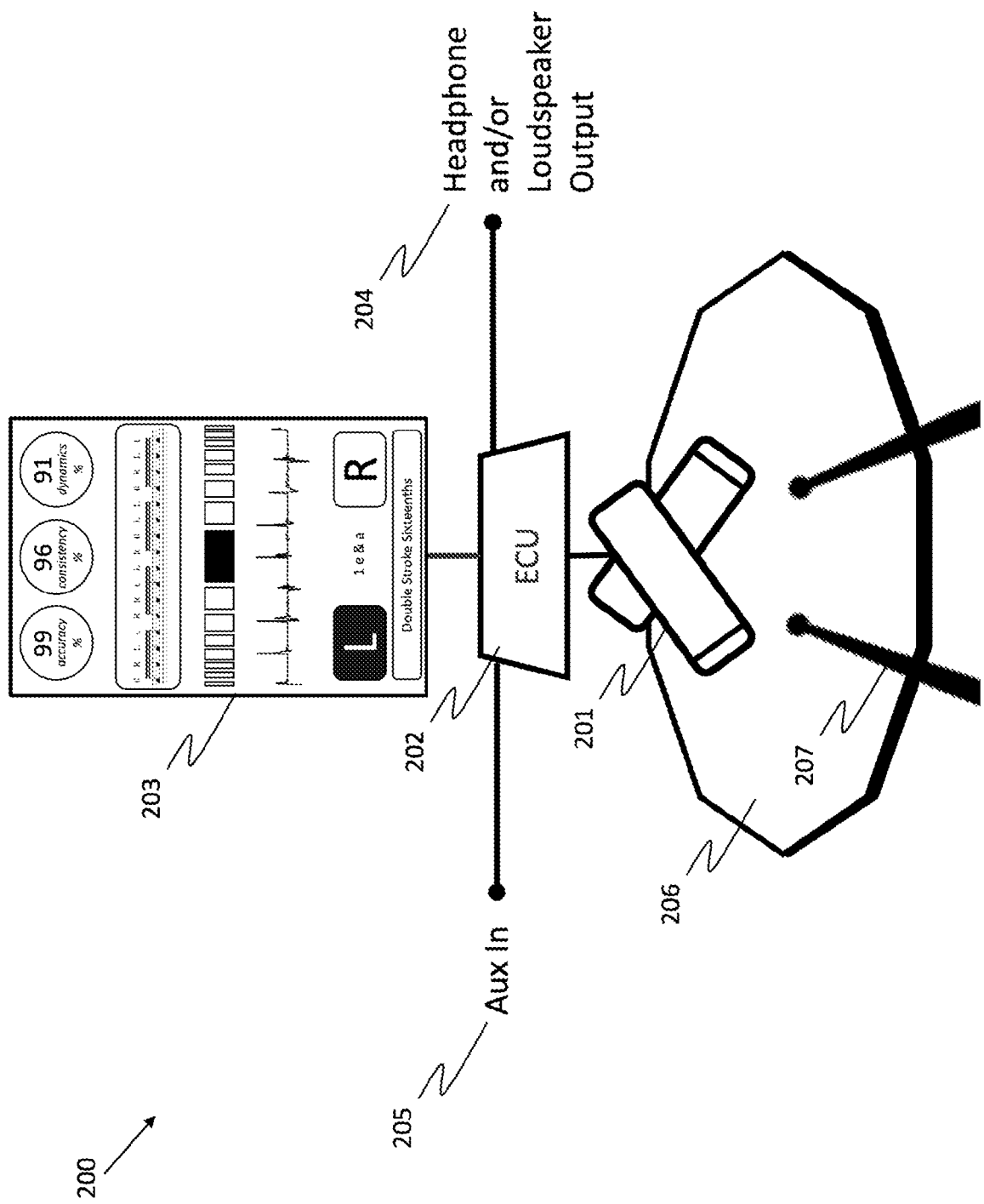
FIG. 2 shows a schematic representation of an example of a system in which percussive performances can be evaluated.

Referring to FIG. 2, there is shown an example of a system 200. The example system 200 has a combination of hardware and software components.

In this specific example, the system 200 is an electronic drum practice system 200, which comprises one or more electronic components and which a drummer can use to practice their drumming.

The example system 200 comprises one or more sensors 201. The one or more sensors 201 capture percussive performance data. In this specific example, the one or more sensors 201 comprise a stereo microphone 201. The stereo microphone 201 itself comprises two component microphone sensors, which in this example are left and right microphone sensors. However, in other examples, the system 200 comprises a single sensor 201 or comprises more than two sensors 201. In addition, in other examples, the sensor(s) 201 can comprise one or more sensors of a type other than a microphone. For example, the sensor(s) 201 may comprise one or more accelerometers, and/or one or more similar sensors. In general, the sensor(s) 201 may comprise one or more transducers.

The example system 200 comprises an electronic control unit (ECU) 202. The example system 200 also comprises a user interface (UI) 203. The UI 203 displays system information and facilitates user interaction events. In this example, the ECU 202 manages user interaction events, processes sensor data captured by the sensor(s) 201 and provides metrics and/or metadata related to the measurements described in more detail herein. In this example, the ECU 202 also communicates information to the UI 203, which incorporates visual displays. The communication of data between the ECU 202 and UI 203 may be wired or wireless. The communication data may be configured in a bespoke format or use an established protocol, such as the wired Universal Serial Bus (USB) or wireless Bluetooth™ protocols. Such displays may be detailed and/or symbolic. The UI 203 can enable user interaction, performance data displays, feature navigation and/or selection of drumstick practice modes. User interaction via the UI 203 may be via one or more device control buttons, a touch-screen interface, etc.

The example system 200 has a headphone and loudspeaker output 204. In particular, the example system 200 has a headphone output port and a built-in loudspeaker and amplifier circuit 204. In some examples, the system 200 comprises a wireless data output 204, for example a Bluetooth™ data output. However, in other examples, the headphone and/or loudspeaker output 204 may be omitted. In some examples, the system 200 does not output audio, such as a metronome reference. In particular, measurement, characteristic identification, classification and/or evaluation may still be conducted even if a metronome click is not activated.

The example system 200 has an auxiliary audio input 205. The auxiliary audio input 205 enables external audio, such as background audio, to be incorporated while practicing. However, in other examples, the auxiliary audio input 205 may be omitted.

The example system 200 comprises a performance surface 206 in the form of a practice pad. The practice pad 206 is not physically attached to the sensor(s) 201.

The example system 200 comprises impacting members 207 in the form of a pair of drumsticks. The pair of drumsticks 207 includes left- and right-hand drumsticks 207. The drumsticks 207 are not physically attached to other parts of the system 200.

As explained above, the performance surface 206 and/or the impacting members 207 may be of different types in other examples.

The example system 200 is configured and arranged to capture data, such as acoustic data, relating to temporal, dynamic, spatial and/or spectral characteristics of one or more drumstick hits of the drumsticks 207 on the practice pad 206.

Examples will now be described with reference to FIGS. 3 to 5 in which one or more impact waveforms of one or more hits are analysed. Such analysis is referred to herein as "impact waveform analysis". The impact waveform analysis enables a percussive performance to be comprehensively evaluated. The percussive performance may be a practice performance, a live performance (for example with an audience), or any other type of performance.

Three stages of the impact waveform analysis will be described. In a first stage 300, one or more characteristics of the one or more impact waveforms are identified. Although examples described below primarily relate to the identification of the one or more characteristics comprising one or more waveform metrics being measured or calculated based on the one or more impact waveforms, the one or more characteristics may be identified in other ways. For example, the one or more characteristics may comprise one or more features extracted from the one or more impact waveforms, for example using machine learning. As such, example characteristics include, but are not limited to, waveform metrics and features. In addition, identifying the characteristic(s) may involve, but is not limited to involving, measurement, calculation and/or extraction. In a second stage 400, the one or more hits are classified as one or more percussive hit-types based on the one or more waveform metrics. In a third stage 500, the one or more waveform metrics and the one or more percussive hit-types are evaluated against performance target data.

In these examples, the impact waveform analysis is implemented in the example system 200 described above with reference to FIG. 2. For example, the impact waveform analysis may be implemented by the ECU 202.

Figure 3:
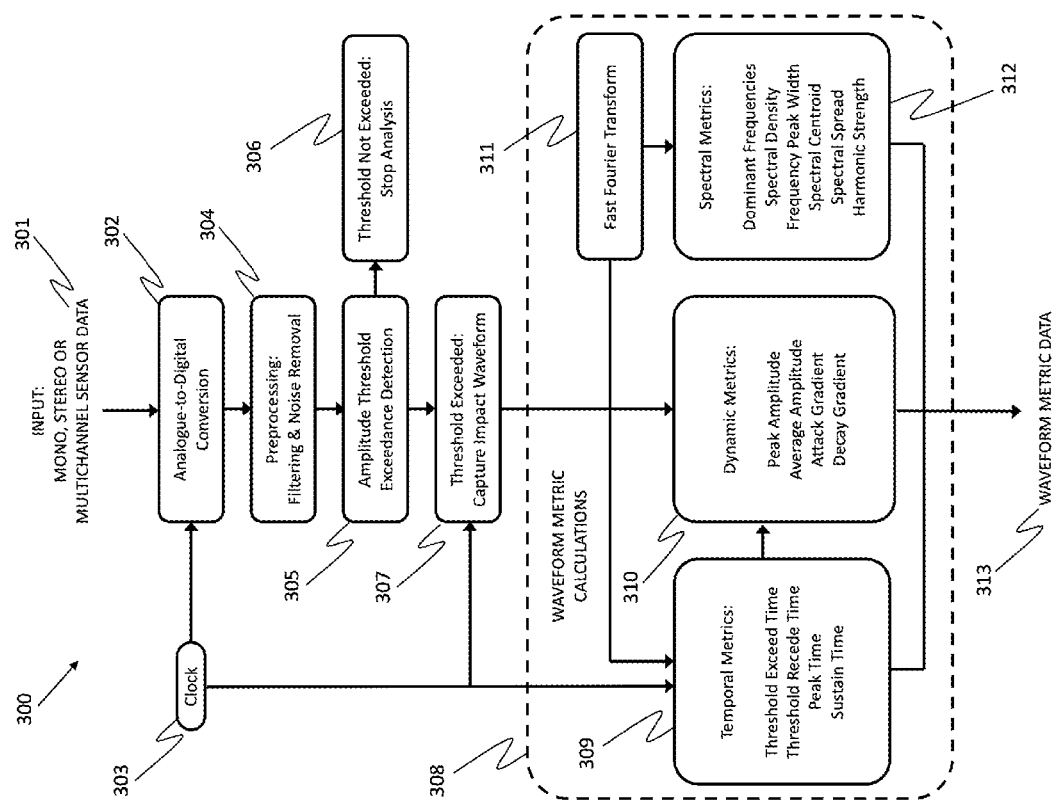
FIG. 3 shows a flow chart illustrating an example of a routine for use in evaluating percussive performances.

Referring to FIG. 3, the first stage 300 is shown.

At item 301, percussive performance data is captured by the sensor(s) 201 and serves as an input to the first stage 300. Percussive performance data may be referred to as "sensor data", "signal data", "waveform data" or the like. The percussive performance data represents one or more impact waveforms of the hit(s) on the performance surface 206. The impact waveform(s) represent one or more profiles of the percussive performance. Where the sensor(s) 201 comprises a stereo microphone, the percussive performance data may represent one or more acoustic profiles (which may be referred to as "acoustic characteristics") of the hit(s).

At item 302, an analogue-to-digital convertor (ADC) circuit converts the percussive performance data from analogue to digital form. The analogue-to-digital conversion performed by the ADC circuit is driven by a digital clock 303. The digital clock 303 may be referred to as a "digital system clock", a "signal clock", or the like. The digital clock 303 is a timing unit which enables capture, processing, computation and/or control of system data at regular, timed intervals. The digital clock 303 is responsible for enabling accurate sampling of the percussive performance data at a specified sample rate. The specified sample rate may be 48 kHz, for example. The digital clock 303 enables calculation of time-based waveform metrics to an accuracy of one audio sample.

In this example, at item 304, following the conversion of the percussive performance data into digital form at item 302, signal pre-processing is employed. Such signal pre-processing may use a number of established audio processing techniques. Examples of such audio processing techniques include, but are not limited to, low-pass filtering, high-pass filtering, dynamic range compression and noise removal.

At item 305, the first stage 300 responds to the input percussive performance data by identifying a percussive event (which may also be referred to as a "percussive performance event"). The percussive event may correspond to a drummer hitting the practice pad 206 with a drumstick 207. In this example, the percussive event is identified when the signal amplitude in the digital-form percussive performance data exceeds a threshold value. The threshold value can be calibrated in various ways. The system 200 may be calibrated to identify a single (also referred to as a "momentary") threshold exceedance. The system 200 may be calibrated to identify the percussive event only when a configured number of samples consecutively exceeds the threshold value. The system 200 may be calibrated to identify the percussive event only when a signal average exceeds a threshold value. Incorporating a number of different threshold exceedance techniques enables the waveform-capture routine, which includes items 302 to 305, to be responsive to an accuracy of one audio sample accuracy, whilst also being reliable and robust. The waveform-capture routine is reliable in that false positives owing to background noise can be ignored. The waveform-capture routine is robust in that double-triggers from a single impact can be avoided.

As indicated by item 306, when no threshold signal exceedance is identified at item 305, the first stage 300 does not perform any further classification-based analysis of the percussive performance data.

At item 307, a threshold exceedance event is identified. A calibrated array (which may also be referred to as a "window") of consecutive sample data is captured. The calibrated array is stored as an impact waveform. The impact waveform describes the dynamic profile of the percussive event. The size of the window (which may also be referred to as the "window size") and, hence, the number of samples of waveform data captured per percussive event, is determined by a number of variables. Examples of such variables include, but are not limited to, the clock speed of the clock 303, the sample rate used during analogue-to-digital conversion at 302, the tempo of the percussive performance and one or more calibration values. The tempo may be expressed in terms of beats-per-minute (BPM). As will be described in more detail below, the calibration value(s) may relate to the type of percussive performance, the type of the impacting member 207, the type of performance surface 206, and/or any other performance context variable. Enabling the window size to be variable enables the impact waveform analysis conducted by the system 200 to be accurate in relation to the specific performance context and the expectant waveform profiles of different performance surfaces 206, impacting members 207, and/or performance tempos.

Once an impact waveform has been captured, one or more waveform metric calculations are performed at item 308.

The waveform metric calculations are performed to classify and evaluate the percussive performance data.

In this example, at item 309, one or more temporal metrics are calculated. Temporal metrics are the results of signal processing calculations related to the time of a hit occurrence and/or the duration of a hit. Temporal metrics enable the system 200 to evaluate the performer's accuracy and/or technique. For example, temporal metrics can enable the system 200 to analyse the performer's performance against a reference metronome sound. Temporal metrics can also enable the system 200 to evaluate timing consistency, for example of a drummer's left-hand hits. Temporal metrics include, but are not limited to, threshold exceed time, waveform peak time, threshold recede time and sustain time. The waveform peak time is the measured time of a peak value within an impact waveform. The threshold recede time is the time of an event where the measured impact waveform amplitude, having previously exceeded a threshold, falls back below the threshold. The sustain time is the duration of which an amplitude threshold exceedance continually repeats within a captured impact waveform, before falling permanently below the threshold value.

In this example, at item 310, one or more dynamic metrics are calculated. Dynamic metrics are the results of signal processing calculations related to impact waveform amplitude and rate of change of impact waveform amplitude. Dynamic metrics also enable the system 200 to evaluate the performer's accuracy and/or technique. Dynamic metrics can, for example, enable the system 200 to classify a drumstick hit as an "accented" (in other words, a purposefully loud) hit. Dynamic metrics can enable the system 200 to evaluate dynamic consistency, for example of a drummer's right-hand hits. Dynamic metrics include, but are not limited to, peak amplitude, average amplitude, attack gradient, and decay gradient. The peak amplitude is the greatest absolute amplitude value within an impact waveform. The average amplitude is the average amplitude value of an impact waveform and can be calculated by averaging some or all of the impact waveform values. The averaging calculation may be based on a root-mean-square (RMS) or may use a similar audio signal averaging calculation. The attack gradient is the rate of change of absolute or average amplitude of an impact waveform prior to a peak amplitude being reached. The decay gradient is the rate of change of absolute or average amplitude of an impact waveform after a peak amplitude has been reached.

In this example, at item 311, the impact waveform is converted into associated frequency domain data. In this example, such conversion implements a fast Fourier transform. However, other conversion techniques could be used in other examples.

In this example, at item 312, one or more spectral metrics are calculated. Spectral metrics also enable the system 200 to evaluate the performer's accuracy and/or technique. Spectral metrics may enable the system 200 to identify sonic characteristics that may be different between left- and right-hand hits. Hence, spectral metrics can give an indication of different performance techniques used by each hand. Spectral metrics include, but are not limited to, identification of dominant frequencies, spectral density, frequency peak width, spectral centroid, spectral spread and harmonic strength. Dominant frequencies are frequency values associated with peaks identified on the frequency spectrum of the impact waveform. Spectral density is the abundance of frequency peaks and frequency content on the frequency spectrum of the impact waveform. Spectral density may be calculated in various ways. Example techniques for calculating spectral density include, but are not limited to, measuring the area under the curve of the frequency spectrum, and mathematical integration of the frequency spectrum. Frequency peak width is the width of dominant frequency peaks, measured at a specified relative power amplitude on the frequency spectrum. Spectral centroid is the frequency at the centre of the spectral power distribution. Spectral spread is calculated as a measure of the distribution of the spectrum from the spectral centroid. Harmonic strength is the spectral density of harmonics of one or more dominant frequencies. Harmonic frequencies are defined as occurring at integer multiples of a specified dominant frequency.

Collectively, the measured and calculated temporal metric(s), dynamic metric(s) and/or spectral metric(s) constitute impact waveform metric data 313. The impact waveform metric data 313 is used in the second and third stages 400, 500. As such, the impact waveform metric data 313 is used for impact waveform analysis and, in particular, classification and evaluation.

Figure 4:
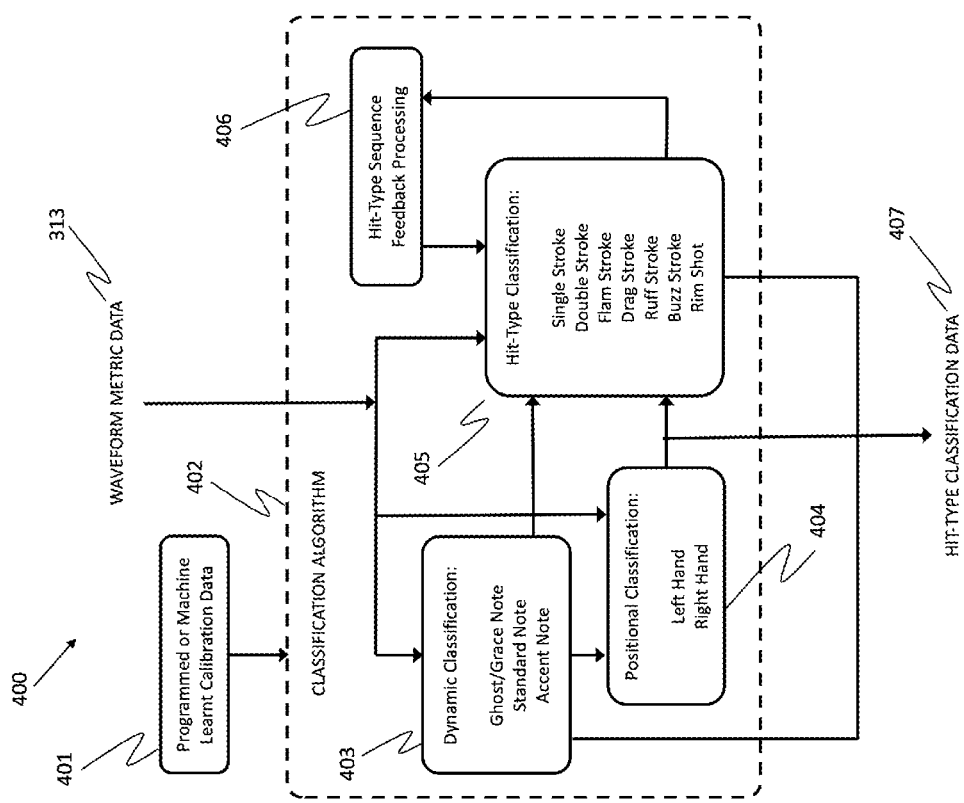
FIG. 4 shows a flow chart illustrating another example of a routine for use in evaluating percussive performances.

Referring to FIG. 4, the second stage 400 is shown.

In the second stage 400, the impact waveform metric data 313 resulting from the first stage 300 is analysed with reference to calibration data 401 to implement a hit-type classification routine 402. The calibration data 401 may comprise programmed and/or machine learnt calibration data. The hit-type classification routine 402 is a digital routine for classifying one or more hits as one or more percussive hit-types based on the one or more impact waveforms that represent the one or more hits. The term "hit-type" describes a typology of one or more hits on the performance surface 206. In the context of a drumming performance, example hit-types include, but are not limited to, single strokes, double strokes, flam strokes, drag strokes, ruff strokes, buzz strokes, buzz rolls, rim shots, and combinations thereof. Hit-type classification enables the system 200 to evaluate the percussive performance against a performance target. Such evaluation can, for example, verify how accurately a drummer delivered an accented paradiddle performance. Such accuracy may be in terms of performing each correct hit-type at the right time, and/or performing each hit accurately and consistently with respect to each hit, and/or with reference to a target metronome click. Temporal calculations may still be performed and used in the absence of a metronome click or reference tempo. For example, a single drag tap has timing attributes within its performance (ghost-ghost-tap-accent), regardless of whether it is in time with respect to a reference click or not.

In this example, the hit-type classification routine 402 incorporates a number of classification sub-routines.

In this example, at item 403, dynamic classification is performed. Dynamic classification 403 involves analysis and classification of the dynamic properties of an impact waveform. Dynamic properties are based on amplitude against time. Dynamic classification 403 may use a number of amplitude values to classify the impact waveform. The amplitude values may be absolute and/or averaged. The impact waveform may, for example, be classified as soft, normal or loud. In the context of drumstick hits, the impact waveforms may be classified as ghost notes, grace notes, standard notes and accented notes. Ghost notes and grace notes are similar to each other. A ghost note is a quiet note in its own right, and a grace note is a note that leads another note and is usually quiet. In examples, grace note analysis therefore involves temporal analysis and feedback classification. Dynamic classification 403 may incorporate analysis of spectral data, since power and contact time impacts excite different vibration frequencies in performance surfaces 206 and impacting members 207.

In this example, at item 404, positional classification is performed. Positional classification 404 incorporates classification of an impact waveform based on the positioning of the percussive performance. The positioning may be spatial or locational. Spatial and locational positioning are similar to each other. However, as used herein, spatial positioning is measured by acoustic transmission and relates to a position in a fluid (such as air), and locational positioning is measured by vibration and relates to a position on a solid (such as on a plate or surface). In the context of drumstick hits, positional classification 404 may involve comparing impact waveform amplitudes from different channels of a multi-channel signal. For example, positional classification 404 may evaluate whether the left channel data has a greater amplitude than the right channel data. If so, the impact waveform can be associated with, or denotes, a left-hand hit. One or more spectral metrics may be used to assist with positional classification 404. For example, different locations of impact may excite uniquely different spectral profiles. The role of positional classification 404 with respect to drumstick hits is to classify which drumstick hits were performed by which drumstick held in which of the drummer's hands. Positional classification 404 is therefore implemented to identify the hand (left or right) which was responsible for a particular impact and/or combination of impacts. Positional classification 404 may be extended for more detailed classification of the drumstick hit position in three-dimensional space. For example, the drumstick hit position may be classified as high, low, close, far, left, right, centre, etc. Left- and right-hand drumstick impacts may be independently detected.

In this example, at item 405, hit-type classification 405 is performed. Hit-type classification 405 uses the results of the dynamic classification 403 and/or the positional classification 404 to classify hits and/or combinations of hits. Hit-type classification 405 may use programmed benchmarks and/or classification features and parameters from machine learnt impact waveform profiles. For example, a single hit may be classified as a quiet (also known as a "ghost") right-hand drumstick hit. However, by additional analysis of one or more prior and/or following drumstick hits, the drumstick hit may also be classified as being part of a predetermined sequence of drumstick hits. As such, the drumstick hit may be classified as being the first drumstick hit within a recognised drumstick stroke that incorporates more than one drumstick hit. Knowledge of the prior and/or following drumstick hits may be sequentially held and/or fed back, as indicated at item 406, into the hit-type classification 405. For example, a quiet right-hand drumstick hit followed quickly by an accented left-hand drumstick hit describes a left-hand flam stroke. The flam stroke is a drum stroke which incorporates two drumstick hits played in a particular way. Different drumstick hit types performed with either the left or right hand can therefore be classified.

Collectively the dynamic, positional and/or hit-type classification results constitute combined hit-type classification data 407.

Figure 5:
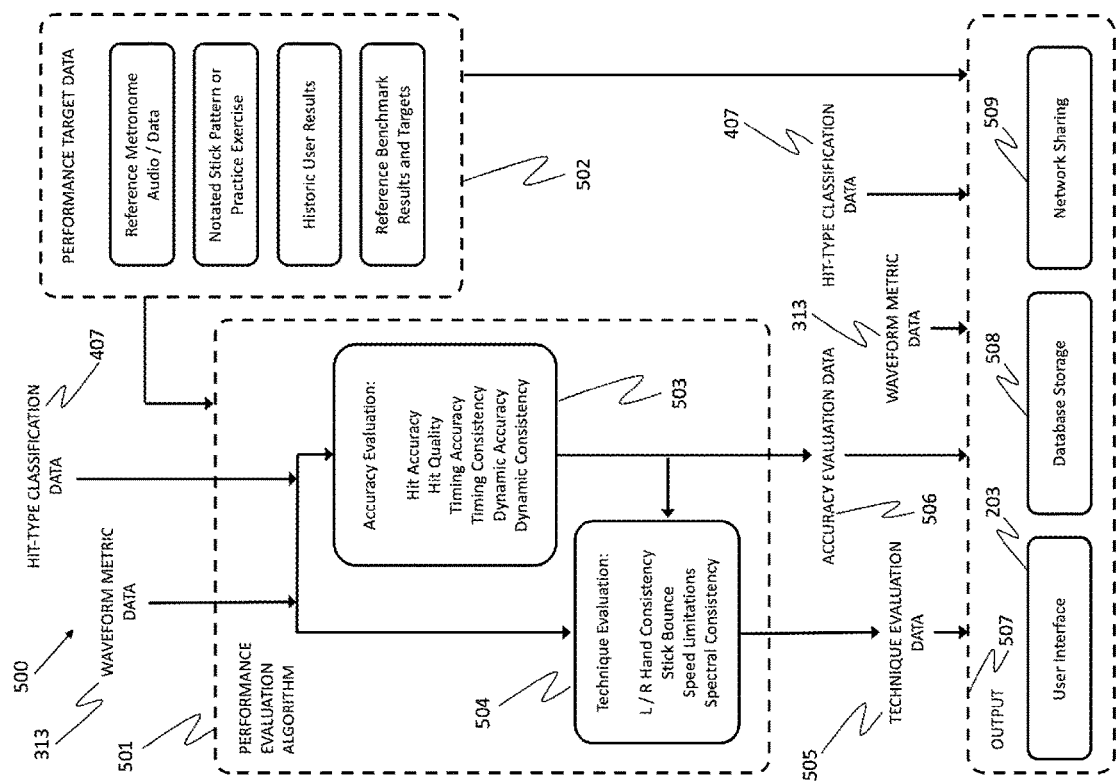
FIG. 5 shows a flow chart illustrating another example of a routine for use in evaluating percussive performances.

Referring to FIG. 5, the third stage 500 is shown.

In this example, at item 501, a performance evaluation sub-routine compares the impact waveform metric data 313 from the first stage 300 and the hit-type classification data 407 from the second stage 400 against performance target data 502. The performance evaluation algorithm 501 calculates the objective achievement of accuracy targets and provides further metrics related to performance technique. The performance target data 502 can be used by the performer as a reference when delivering a percussive performance. The performance target data 502 may include, but is not limited to including, a reference metronome timing signal, a notated percussion pattern, a rudiment technique or practice exercise to be followed, historic results for comparison against, and benchmark results of other performers for comparison against. The reference metronome timing signal may be fixed or variable with respect to tempo, volume, dynamic profile and/or spectral profile. The reference metronome timing signal may comprise a computer-controlled click sound, which may maintain a consistent or programmed profile.

In this example, at item 503, an accuracy evaluation sub-routine evaluates the impact waveform metric data 313 and the hit-type classification data 407. Different accuracy evaluation criteria may be programmed into the accuracy evaluation routine 503.

One example accuracy evaluation criterion is hit accuracy. Hit accuracy is a measure of how successfully the performer enacted one or more designated strokes, hits, patterns and/or sequences of hits, for example as directed by a target exercise. The target exercise may be notated or otherwise communicated to the performer. In the context of a drumstick performance, stroke accuracy may give a measure of the successful performance of one or more specific drum strokes in a sequence as specified by the performance target data 502. The performance target data 502 may be in the form of, for example, a notated drumstick pattern or described practice exercise. This can enable a drummer's performance accuracy with respect to a chosen rudiment exercise and/or stick pattern to be evaluated.

Another example accuracy evaluation criterion is hit quality. Hit quality is a measure of the temporal, dynamic and/or spectral qualities of a particular classified hit-type with respect to a benchmark (also referred to as "exemplar") profile of the classified hit-type. In the context of a drumstick performance, hit quality denotes a measure of the similarity between a particular drum stroke and a benchmark ideal equivalent. For example, the benchmark ideal may identify the temporal and/or dynamic qualities of a drumstick hit that has been classified as a drag stroke.

Another example accuracy evaluation criterion is timing accuracy. Timing accuracy is the timing of a percussive hit or hits in comparison to a reference, such as a reference metronome or timing chart. Timing accuracy may be calculated by measuring the timing difference between the absolute time of a metronome click event and the absolute time of a classified percussive hit. Timing accuracy may be calculated in various ways. For example, timing accuracy may be calculated with respect to the time an impact waveform threshold is exceeded, the time of an impact waveform peak, and/or the time an average impact waveform amplitude exceeds a threshold value. Timing accuracy may be measured in samples, milliseconds, as an error value based on the intended performance tempo, and/or in another manner. The error value may, for example, correspond to an accuracy and/or inaccuracy percentage related to one semiquaver time period. Using a number of timing accuracy calculations enables more reliable results to be gathered for a specific performance context. For example, some performance surfaces 206 may be hard and have a rapid impact waveform attack leading to a very clear peak value calculation, whereas other performance surfaces 206 may be soft and, hence, have a less apparent single impact waveform peak. An average amplitude analysis technique may, therefore, assist with accurately and reliably identifying the timing and, hence, the accuracy of the impact occurrence. In scenarios in which the performer purposefully wishes to practice playing a specified time period ahead of or behind the reference beat, then timing accuracy evaluations can be adjusted (also referred to as "offset") to give a value related to their specific performance intention. The precise impact time of each hit can thereby be measured, which can enable a performer's temporal performance accuracy to be evaluated, for example with respect to an acoustic and/or visual datum metronome signal.

Another example accuracy evaluation criterion is timing consistency. Timing consistency is a metric related to the variance or standard deviation of timing accuracy. This can be an effective measure because a performance may be consistently inaccurate. For example, the performance may be consistently 20 milliseconds late, behind the metronome datum. This differs considerably from a performance that repeatedly falls behind or rushes ahead of the reference metronome click. Some percussive performers may accidentally or purposefully play "behind the beat" or "ahead of the beat" for certain music genres. In such instances, evaluation of performance consistency can be more valuable to the performer than performance accuracy. Temporal accuracy values can also be calculated without comparison to a reference metronome click, instead being calculated with reference to the timing of other strokes or hits within the performance pattern. For example, a "drag-tap" pattern features a repetition of two semi-quaver notes followed by two quaver notes. Temporal accuracy evaluation of a "drag-tap" pattern can therefore be, for example, a measure of accuracy that the semiquaver notes are always at double length time intervals with respect to the semi-quaver notes, regardless of the performance tempo. Temporal consistency evaluations related to the relative timing of strokes or hits can therefore also be conducted.

Another example accuracy evaluation criterion is dynamic accuracy. Dynamic accuracy is the dynamic classification of one or more hits when compared to one or more dynamic profiles denoted in a percussive performance sequence as specified by the performance target data 502, for example in the form of a notated drumstick pattern or a described practice exercise. In the context of a drumstick performance, dynamic accuracy can give a measure that denotes how often a soft or accented hit-type was performed at the correct moment, for example as designated by a reference performance exercise that includes grace, ghost and/or accented notes.

Another example accuracy evaluation criterion is dynamic consistency. Dynamic consistency is a measure of the variance or standard deviation of one or more dynamic metrics for a number of classified hit-types. This can be an effective measure for a number of scenarios. A dynamic consistency metric can be used to verify whether both left and right hands are performing with similar dynamic characteristics. Dynamic consistency can be used to verify that all accented notes are of similar dynamic strength. A corresponding verification can be performed for ghost notes and standard notes, for example. Dynamic consistency can also give an overall measure of dynamic consistency related to multiple drum roll strokes and/or other performance patterns.

In this example, alongside the accuracy evaluation routine 503 is a technique evaluation routine 504. The technique evaluation routine 504 calculates one or more metrics relating to performance technique. The technique evaluation routine 504 advises the performer on methods for improving performance technique.

Various example technique evaluation metrics will now be described, by way of example only.

One example technique evaluation metric is left-/right-hand consistency and/or accuracy evaluation. This is a niche or holistic evaluation of the percussive performance with respect to the performer's control and/or accuracy between the left and right hands. In the context of drumstick hits, this evaluation metric can evaluate the consistency and variance of some or all metrics and evaluation data with respect to the hand which performed or led (also referred to as "instigated") one or more drumstick hits. For example, this evaluation metric may identify whether either hand generates impact data that has dynamic and/or spectral differences compared to the other hand. This evaluation metric may also identify whether one hand is more likely responsible specifically for timing inaccuracies on a two-hand percussive performance. For example, if the left hand is consistently inaccurate with timing but the right hand is consistently accurate, the technique evaluation algorithm 504 can highlight this and can suggest practice exercises specifically aimed at improving the left-hand timing accuracy.

Another example technique evaluation metric is stick bounce. Stick bounce (which may be referred to as "impulse contact time") is a measure correlated to the contact time between a drumstick 207 and a performance surface 206 during a hit event. Hence, stick bounce gives an indication of the performer's technique in bouncing the drumsticks 207 in their fingers versus driving the drumstick 207 into the performance surface 206 with the drumsticks held more rigidly in the fingers and a hit motion controlled predominantly with their wrists. If the drumsticks 207 generate too much contact time with the performance surface 206, the system 200 may suggest modifications and/or practice exercises to the performer to improve their stick bounce when hitting. Generally, a technique with more bounce (a shorter surface contact time) is a more efficient performance technique at higher performance speeds, enabling accuracy to be maintained at higher tempos and minimising the potential for performer fatigue and injury. As such, the impulse contact time of each drumstick hit can be measured. This enables a metric to be determined which allows drummers to evaluate how much they allow the drumstick 207 to freely bounce back off the performance surface 206 in comparison to a more rigid drumstick technique that drives the drumstick firmer into the performance surface 206 for a longer period of time. Spectral analysis may also be particularly effective for stick bounce classification, since a more rapid impulse (in other words, a shorter contact time) allows the performance surface 206 to vibrate with less loading and, hence, more freely and for longer.

Another example technique evaluation metric is speed limitation. Speed limitation is the identification of one or more performance tempos which appear to challenge a particular performer the most. Drummers often find it challenging to play very slow or very fast and an indication of where their performance drops off at these extremes is valuable to know. Additionally, many performers find there is a challenging tempo range in the middle of their overall performance range where stick technique changes from a more rigid wrist technique to bouncing the drumsticks in the fingers. Identification of this speed limitation is valuable to the performer, as is tracking speed limitations for variances and improvements over time.

Another example technique evaluation metric is spectral consistency. Spectral consistency involves analysis of the frequency spectrum for different drumstick hits. Spectral consistency can give an indication of sonic differences between, for example, the left and right hand. A performer may be able to play accurately and consistently, yet their technique causes drumstick hits in each hand to sound different. Spectral analysis of each hand's drumstick hits can be used to identify one or more acoustic characteristics which may indicate inconstant performance techniques between the two hands.

The dynamic power of each drumstick hit can be measured. This can enable quiet ("ghost") notes, standard-volume notes and louder, accented notes to be identified. As such, notes of varying degrees of "loudness" classification can be identified and classified. Performance accuracy against a chosen rudiment exercise and/or stick pattern, incorporating accented and/or ghosted notes, can also be evaluated. Dynamic analysis of each drumstick hit also allows the performance consistency of loudness and the overall dynamic profile of each drumstick hit to be evaluated with respect to a classification of each dynamic hit for each hand, and/or in comparison between the hands. This can enable, for example, a measure of the consistency of loudness in all accented drumstick hits on the right hand to be determined, and/or the consistency of accented drumstick hits between the left and right hands to be evaluated.

In this example, resultant technique evaluation data 505 and accuracy evaluation data 506, along with the waveform metric data 313, hit-type classification data 407 and the performance target data 502 are forwarded to an output system 507. As such, performance evaluation data is output based on the evaluating carried out in the third stage 500. In this example, the performance evaluation data comprises both the technique evaluation data 505 and the accuracy evaluation data 506, but could comprise other and/or additional data in other examples.

The output system 507 can incorporate a number of features.

One example feature of the output system 507 is the UI 203. The UI 203 enables data to be communicated to the performer. The UI 203 also enables user input to be received before, during and/or after the performances take place. The UI 203 may take the form of a touch-screen interface, such as a high-resolution touch-screen interface. The UI 203 may be designed as a number of physical control buttons, for example with bespoke designed displays and/or indicators. The user may be informed of impact waveform metric data 313, hit-type classification data 407, technique evaluation data 505 and/or accuracy evaluation data 506 in near real-time, via the UI 203, while they are performing. This allows the performer to positively modify their performance as they perform, with guided feedback. The use of real-time feedback to the performer enables them to identify the quantitative results of small technique changes made while they perform. This results in a rapid learning feedback loop that is capable of accelerating a percussion performer's development. In some examples, intelligent performance analysis routines that intelligently analyse performance traits provide tailored learning guidance to the user via the UI 203, for example while the performer is performing. Bespoke guidance may be provided to the performer via the UI 203, for example when a specific weakness in their performance is identified. The UI 203 may also or instead display the corresponding musical notation of the hit(s) classified and evaluated during the performance. The notation of a performance is valuable for enabling the user to compare their performance visually against any target performance data (such as notation) which was used during the performance. Displaying the performance evaluation data as music notation also provides a useful visual tool for automatically transcribing or documenting a percussive performance, allowing time savings in creating music notation of drumstick or other percussion patterns.

Another example feature of the output system 507 is a database storage feature 508. The database storage feature 508 enables users to store target performance data 502 and/or percussive performance data. As such, the database storage feature 508 may allow functionality including, but not limited to, tracking of performance metrics over time, historical analysis of performance achievements, bespoke exercises and percussive performance targets to be set and/or recorded. The performer may be able to design their own practice patterns and store them using the database storage feature 508.

Another example feature of the output system 507 is a network sharing feature 509. The network sharing feature 509 can enable both visibility of, and access to, output data between users. The network sharing feature 509 facilitates network-connected and/or online percussive performance charts, comparisons and/or competitions. As such, online and/or network connectivity can be incorporated, allowing users to share practice patterns and/or performance results with other users. Such sharing may be enabled through an online collaboration database. As such, users can access predefined drumstick rudiments and/or practice patterns and/or can design their own bespoke practice patterns.

The impact waveform analysis described herein enables a percussive performance to be evaluated comprehensively. Many parameters of the percussive performance can be evaluated and fed back to the performer, for example during a percussive performance. Such a comprehensive evaluation enables the performer to identify specific techniques to practice and allows the performer to fine-tune the techniques to achieve a desired level of competency.

Figure 6:
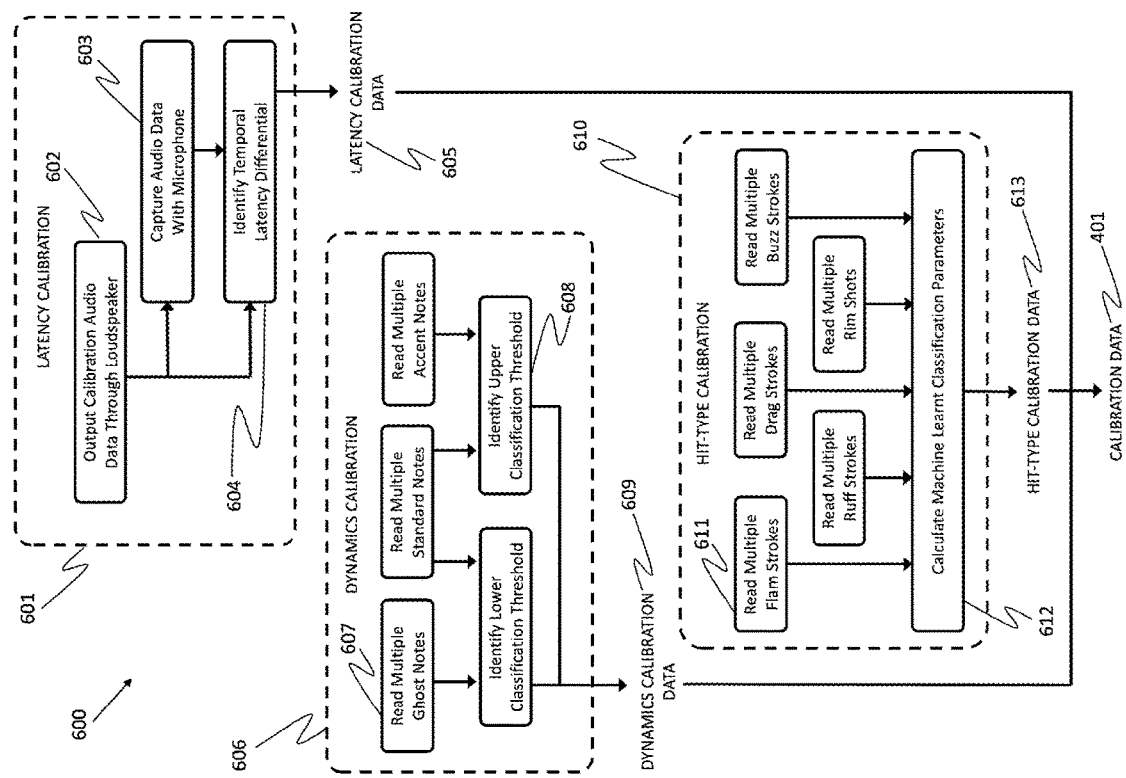
FIG. 6 shows a flow chart illustrating another example of a routine for use in evaluating percussive performances.

Referring to FIG. 6, there is shown an example of a calibration routine 600. In some examples, machine learning is used to improve measurement and/or classification accuracy with respect to system latency of the system 200, the performer's performance techniques, and/or different types of performance surfaces 206.

As explained above, the impact waveform analysis uses calibration data 401 to enable the system 200 to perform to a high-quality standard under a number of different scenarios. The calibration data 410 may comprise programmed and/or machine learnt calibration data. Calibration enables the system 200 to optimise for different circumstances and/or setup scenarios and/or performance contexts. For example, the system 200 can be optimised for percussive performances with different types of impact members 207 and/or for different performance surfaces 206.

Calibration can be conducted during manufacture of the system 200 and/or in-field. For example, impact threshold values for triggering a waveform capture event may be factory-set. However, the user may be able to modify the sensitivity of the impact waveform analysis through the system UI 203. Similarly, pre-programmed parameters for classifying different hit-types may be incorporated into the manufacture. However, a machine learning routine may be used to further improve the classification algorithm in-field by the user.

The calibration routine 600 may incorporate various different calibration sub-routines.

One example calibration sub-routine is a latency calibration sub-routine 601, which may be referred to as a "latency differential" sub-routine. The latency calibration sub-routine 601 calculates the digital processing time difference between an output signal 602 being output and a captured input 603 of the same signal. The output signal 602 may comprise a metronome click sound. The output signal 602 may be output through one or more loudspeakers 204. The captured input 603 of the same signal may be the same metronome click. The input 603 may be captured through the sensor(s) 201. The latency differential 604 and, hence, the latency calibration data 605 output by the latency calibration sub-routine 601 may be used to make temporal measurements accurate to one audio sample. The latency calibration data 605 may incorporate latency average values and/or latency values for different features of the system 200. The latency calibration data 605 may enable data provided to the user via the UI 203 to be immediate, in other words in real-time. For example, a user may choose to use Bluetooth™ (and/or other wireless-enabled) headphones to listen to a metronome click track they are using as a performance target. Implementing the latency calibration sub-routine 601 on the system 200 can, hence, eliminate temporal metric inaccuracies that might be caused by inherent time delays associated with Bluetooth™ audio transfer.

Furthermore, the latency calibration sub-routine 601 may involve multiple latency calculations, for example where two-way latency is encountered in the system 200. A particular example is if wireless, such as Bluetooth™, communications are used for both transmitting the metronome click sound and for communicating performance data from the device ECU 202 to the UI 203. In this instance, bi-directional latency is encountered and the calibration accounts for both the latency associated with the transmitted metronome sound and the latency associated with the transmitting of performance data. In this scenario, the latency calibration sub-routine enables two-way latency compensation to be implemented in order to realise accurate and real-time performance data analysis.

Another example calibration sub-routine is a dynamics calibration sub-routine 606. The dynamics calibration sub-routine 606 uses pre-programed parameters. The dynamics calibration sub-routine 606 incorporates gathering example impact data to enhance the dynamics classification accuracy of the system 200. For example, a user may follow a calibration routine to give examples of multiple ghost, standard and accent notes at item 607. The system 200 can use such example hits to identify optimal upper and/or lower thresholds for classification between the different dynamic types at item 608. The upper and/or lower thresholds can be stored as dynamics calibration data 609. The dynamics calibration data 609 may comprise additional dynamics calibration values.

Another example calibration sub-routine is a hit-type calibration sub-routine 610. Hit-type classification accuracy may be enhanced by machine learning as part of the hit-type calibration sub-routine 610. At item 611, a user is prompted to give multiple example hits of all designated hit-types. At item 612, a machine learning routine is implemented to identify one or more classification features or parameters that best identify and classify each unique hit-type. Hit-type calibration data 613 may incorporate positional data to improve classification accuracy with respect to left-hand and right-hand, and/or other positional classifications. The one or more machine learnt classification features or parameters make up the hit-type calibration data 613. The hit-type calibration data 613 may include pre-programmed and/or user-adjusted settings. As such, machine learning may be used to improve classification of different drumstick hit-types.

Collectively, the calibration data relating to latency, dynamics and/or hit-type constitute the calibration data 401.

As such, the example system 200 can incorporate a learning calibration feature. The learning calibration feature can enable the example system 200 to calibrate for real-time measurement latency compensation, to intelligently differentiate between different types of drumstick hits and/or impacting members 207 and/or to calibrate for different performance surfaces 206. Machine learning can be used to improve classification of different drumstick hits and can improve personalisation of analysis of a performance. Such personalisation can allow for different users' drumming techniques.

Examples have therefore been described in which a hardware- and software-based percussion practice classification system 200 is provided. The system 200 can analyse drumstick hits on a performance surface 206. The system 200 may incorporate a stereo microphone 201 (which may be referred to as a "spatial microphone"), which includes two or more independent microphone capsules. The stereo microphone 201 can gather detailed acoustic information relating to the drumstick hit(s). Using two or more microphones sensors 201 enables location information about the drumstick hits to be extracted from recorded acoustic data and, hence, enables each hit to be classified as originating from the left- or right-hand drumstick 207. The stereo microphone 201 may include left- and right-facing (also referred to as "left- and right-positioned") microphone capsules and, hence, can pick up acoustic measurements that incorporate positional information about the sound source. Additionally, the acoustic impulse data captured by the stereo microphone 201 gives detailed temporal information about the drumstick hit(s). The temporal information is related to the precise timing and dynamic profile of each drumstick hit, where the dynamic profile corresponds to volume, power, or amplitude as a function of time. Where valuable for classification and/or calibration, frequency spectra for drumstick hits can also be calculated from recorded microphone data. This may involve a standard or fast Fourier transform, for example. Evaluating the spatial, temporal, dynamic and/or spectral profiles of the acoustic data enables drumstick impact measurements on a standard drumstick practice pad 206 to be gathered, classified and/or evaluated.

Figure 7:
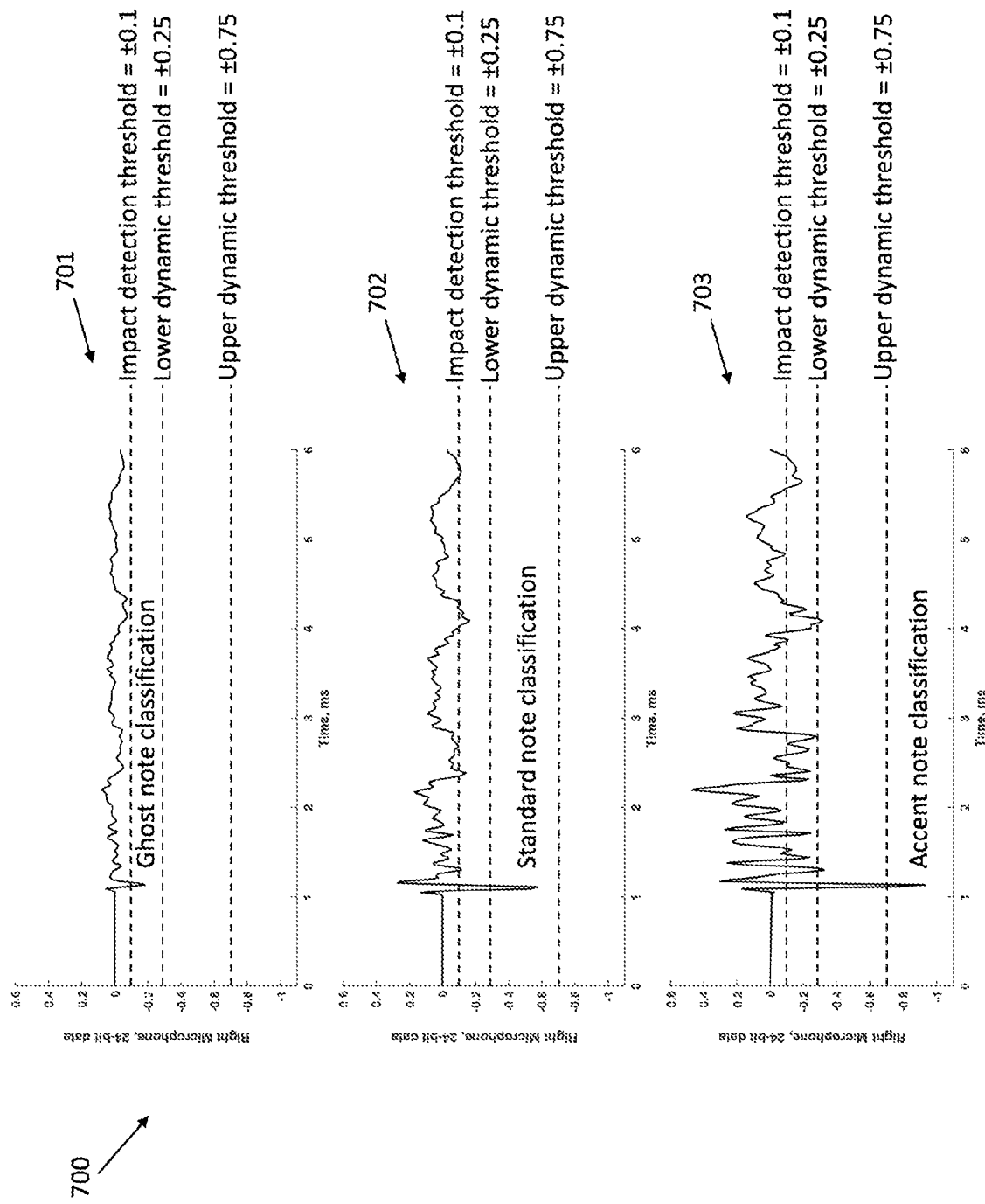
FIG. 7 shows an example set of waveform diagrams illustrating example impact waveforms.

Referring to FIG. 7, there is shown a set of three example impact waveforms 700.

In this example, all the hits represented in the impact waveforms 700 are right-hand hits and are measured by the right-side microphone of the stereo microphone 201. The example impact waveforms 700 highlight the differences between ghost notes, standard notes and accented notes.

Impact amplitude correlates with the loudness of different drumstick hits on a single hand. Example amplitude thresholds are shown to indicate how an example, low-complexity classification protocol can be used to classify the hits. In this example, an impact detection threshold is set at ±0.1, a lower dynamic threshold is set at ±0.25 and an upper dynamic threshold is set at ±0.75. Waveform peak values may be used to identify which amplitude thresholds are breached and, hence, to enable dynamic classification of the hits. Average signal values may be calculated and evaluated against average threshold values to assist with dynamic classification.

The top impact waveform 701 represents an example ghost drumstick hit and is classified as a ghost note since it has passed the impact detection threshold, but has not passed the lower dynamic threshold.

The middle impact waveform 702 represents an example standard drumstick hit and is classified as a standard note since it has passed the impact detection threshold and the lower dynamic threshold, but has not passed the upper dynamic threshold.

The bottom impact waveform 703 represents an example accented drumstick hit and is classified as an accented note since it has passed the impact detection threshold, the lower dynamic threshold, and the upper dynamic threshold.

Figure 8:
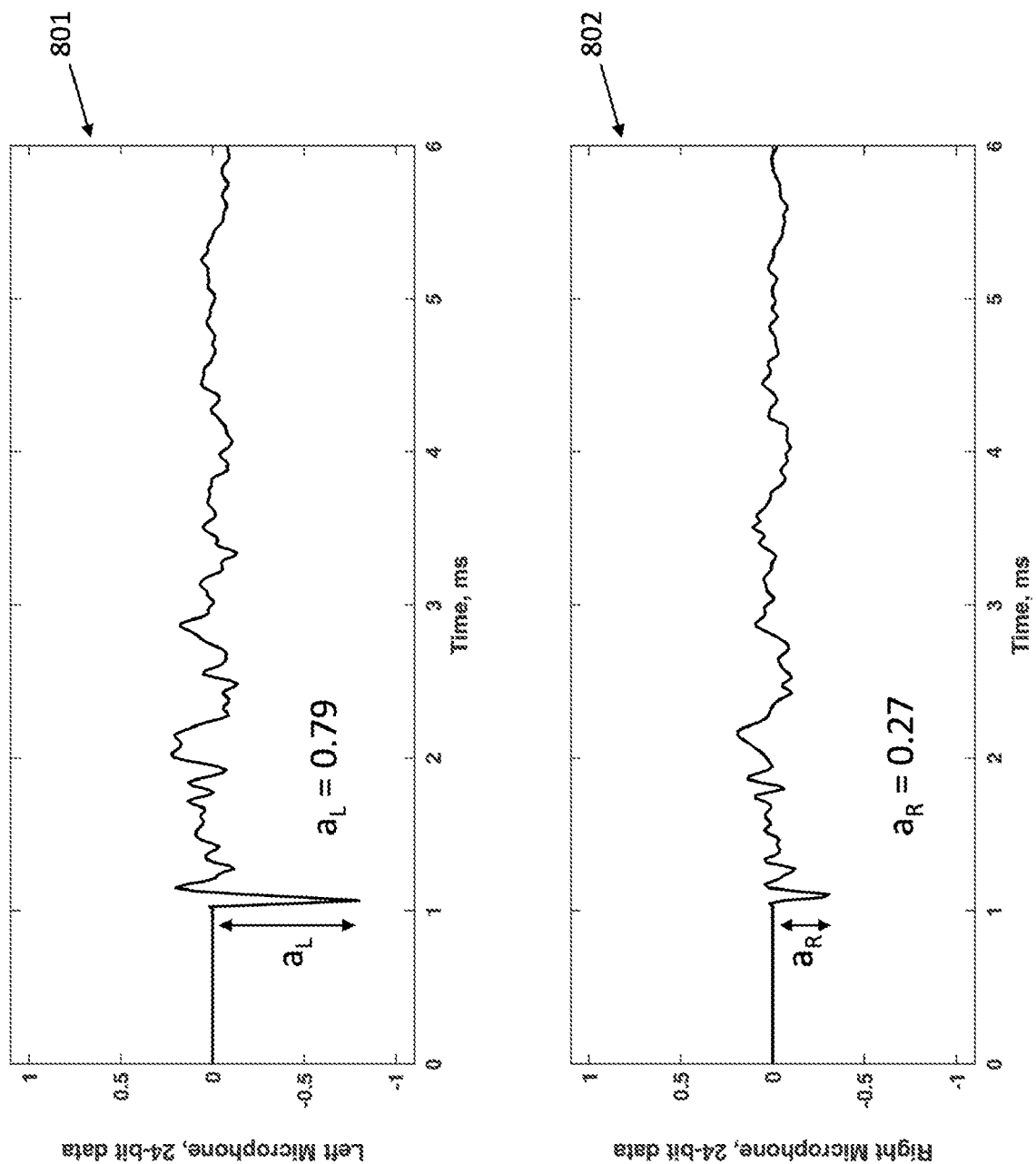
FIG. 8 shows a further example set of waveform diagrams illustrating further example impact waveforms.
Figure 9:
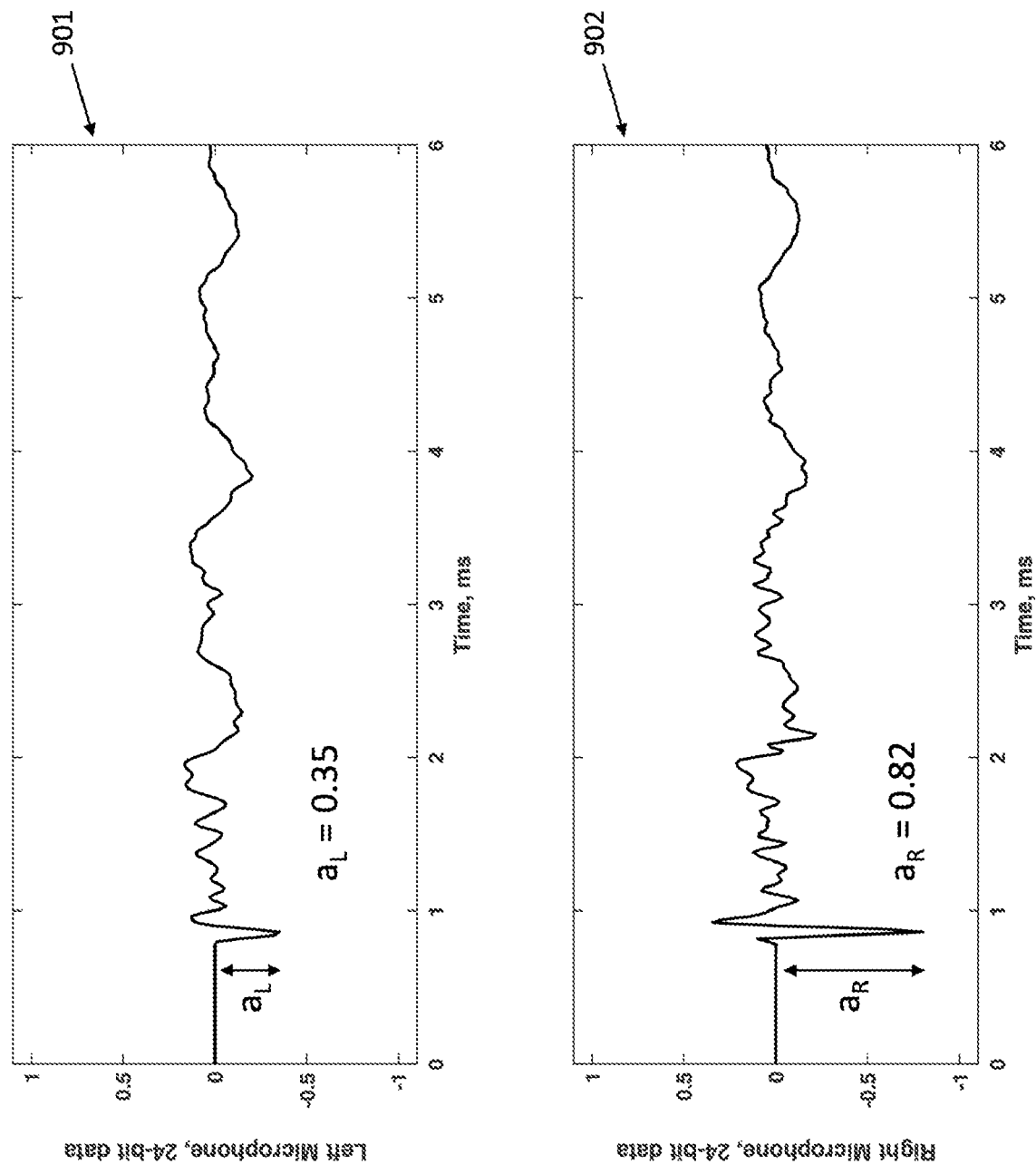
FIG. 9 shows a further example set of waveform diagrams illustrating further example impact waveforms.

Referring to FIGS. 8 and 9, there are shown further sets of example impact waveforms 800, 900.

The example impact waveforms 800 and 900 represent example stereo sensor signals captured for the left hand and right hand respectively. As such, the example waveforms 800 and 900 illustrate classification of left- and right-hand drumstick hits respectively. A left-hand drumstick hit is measured more strongly by the left-side microphone sensor, and vice-versa for the right-hand side. The differentiation between left- and right-hand hits is, in this example, by the absolute amplitude of the peak value of each impact, denoted $a_L$ and $a_R$ respectively. In particular, impact waveform 801 (captured by the left microphone sensor) has a peak amplitude value of $a_L=0.79$, which is greater than the peak amplitude value of $a_R=0.27$ of impact waveform 802 (captured by the right microphone sensor). As such, the hit represented by impact waveforms 801 and 802 is classified as a left-hand hit. In contrast, impact waveform 901 (captured by the left microphone sensor) has a peak amplitude value of $a_L=0.35$, which is lower than the peak amplitude value of $a_R=0.282$ of impact waveform 902 (captured by the right microphone sensor). As such, the hit represented by impact waveforms 901 and 902 is classified as a right-hand hit. Analysis of the average waveform amplitude can be used to represent the relative signal power from each hand, and can be used to assist with classification. More detailed analysis of left- and right-hand microphone data allows the identification of strokes that are intended to be played with both hands at the same time, enabling accuracy metrics relating to the synchronicity of such two-hand hits.

Figure 10:
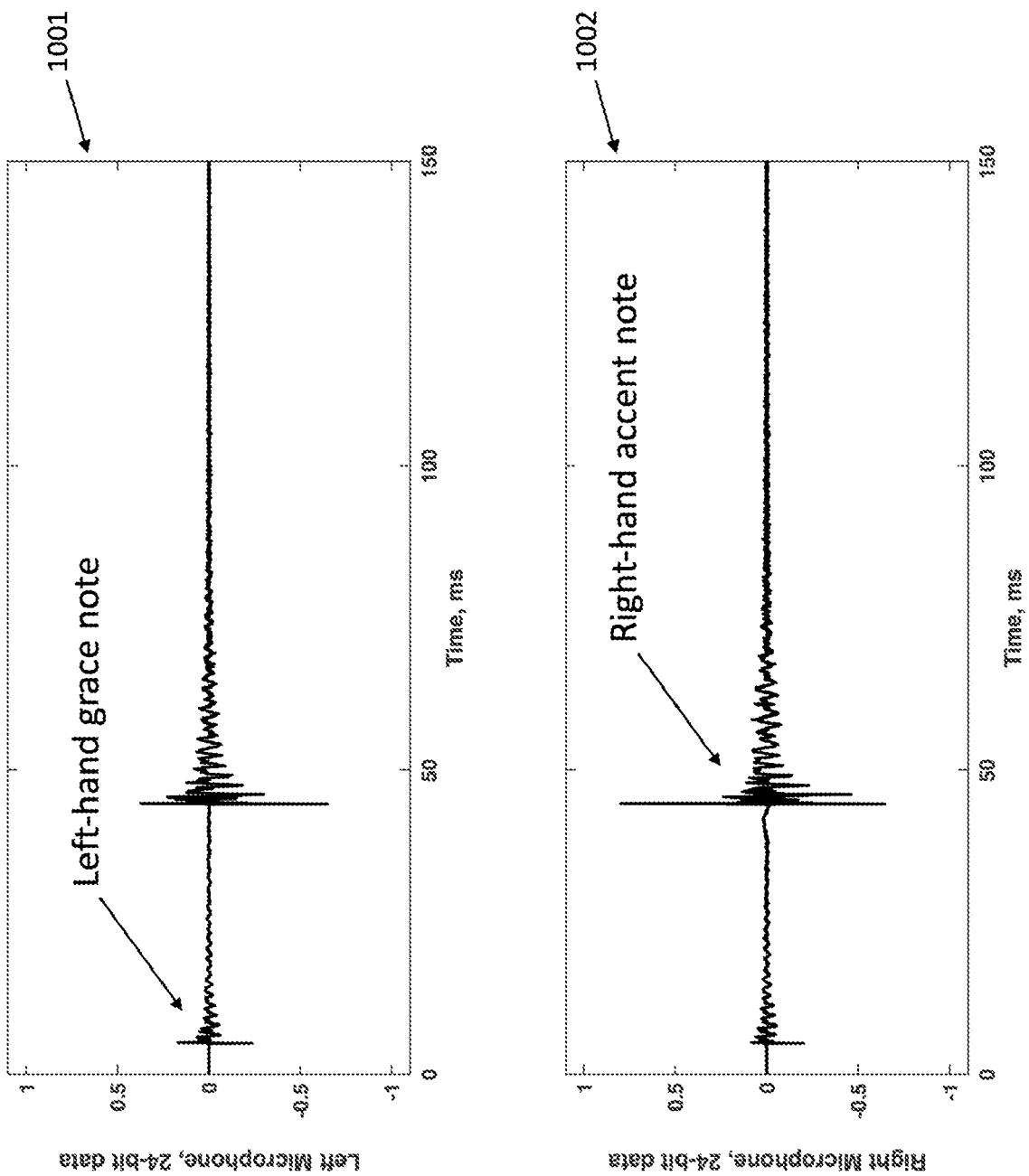
FIG. 10 shows a further example set of waveform diagrams illustrating further example impact waveforms.
Figure 11:
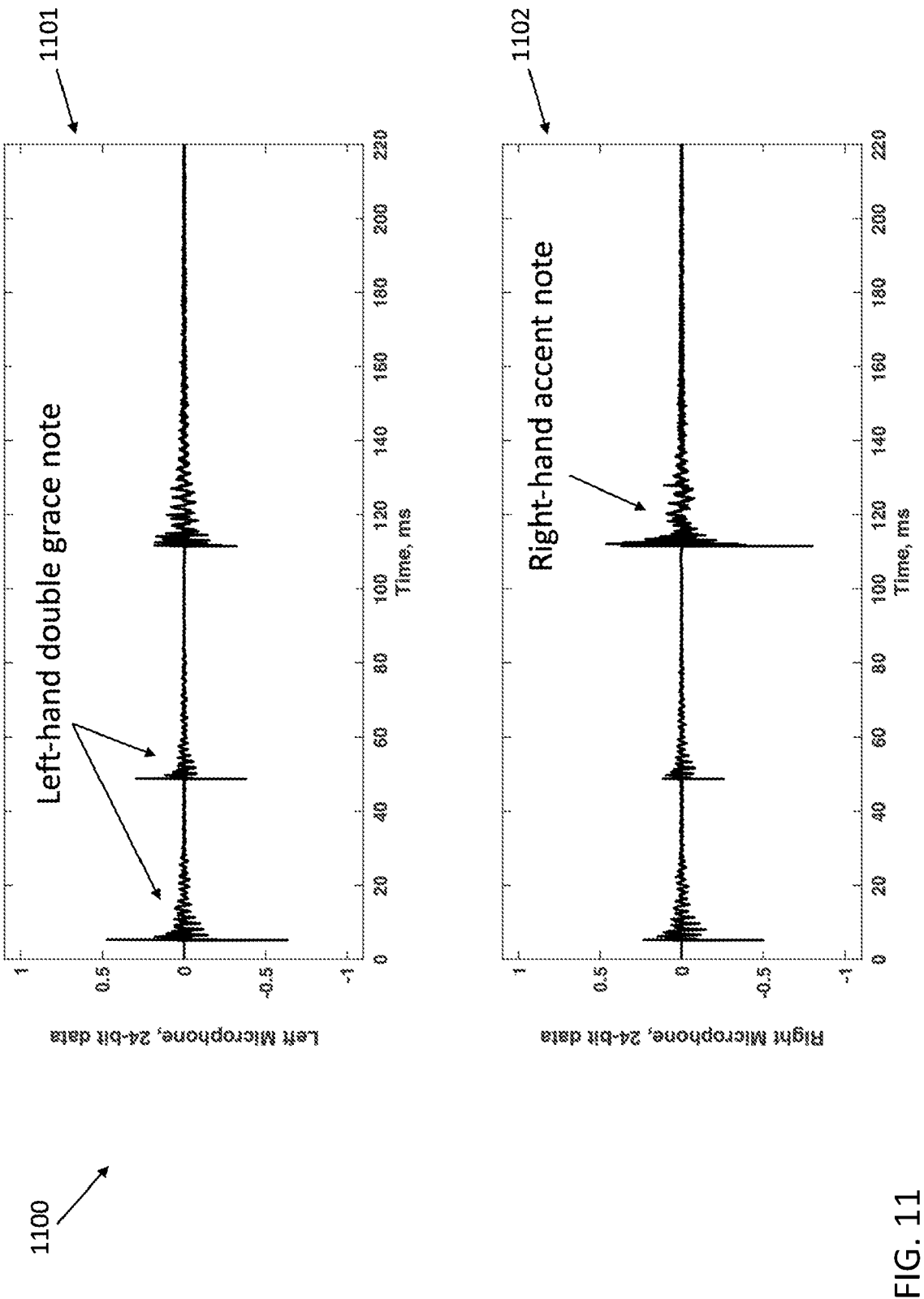
FIG. 11 shows a further example set of waveform diagrams illustrating further example impact waveforms.

Referring to FIGS. 10 and 11, there are shown further sets of example impact waveforms 1000, 1100. The example impact waveforms 1100, 1100 show how hits can be classified as flam and drag hits respectively.

Impact waveforms 1000 represent stereo signal waveforms and classification of a flam drumstick hit. A flam hit is identified by a soft left-hand (grace) hit followed by an accented right-hand hit or a soft right-hand (grace) hit followed by an accented left-hand hit. In particular, impact waveform 1001 (captured by the left microphone sensor) represents two hits, with the first hit being classified as a left-hand grace note. The impact waveform 1002 (captured by the right microphone sensor) also represents two hits, with the second hit being classified as a right-hand accent note. In addition, impact waveforms 1001 and 1002 are collectively classified as a flam drumstick hit. As such, examples enable measurement, classification and timing of flam hits, where one drumstick is played quietly with one hand and followed quickly by a louder, accented drumstick hit with the following hand. This enables a drummer's performance accuracy with respect to a chosen rudiment exercise and/or stick pattern incorporating flam hits to be evaluated.

Impact waveforms 1100 represent example stereo signal waveforms and classification of a drag drumstick hit. The drag is identified by two left-hand grace hits followed by an accented right-hand hit or two right-hand grace hits followed by an accented left-hand hit. In particular, impact waveform 1101 (captured by the left microphone sensor) represents three hits, with the first and second hits being classified as a left-hand double grace note. The impact waveform 1102 (captured by the right microphone sensor) also represents three hits, with the third hit being classified a right-hand accent note. In addition, impact waveforms 1101 and 1102 are collectively classified as a drag drumstick hit. As such, examples enable measurement, classification and timing of drag and/or ruff hits, where drumstick hits are played as two or more hits at twice (or another multiple of) the speed of the performance context or musical tempo. This enables a drummer's performance accuracy with respect to a chosen rudiment exercise and/or stick pattern incorporating drag and/or ruff hits to be evaluated.

Figure 12:
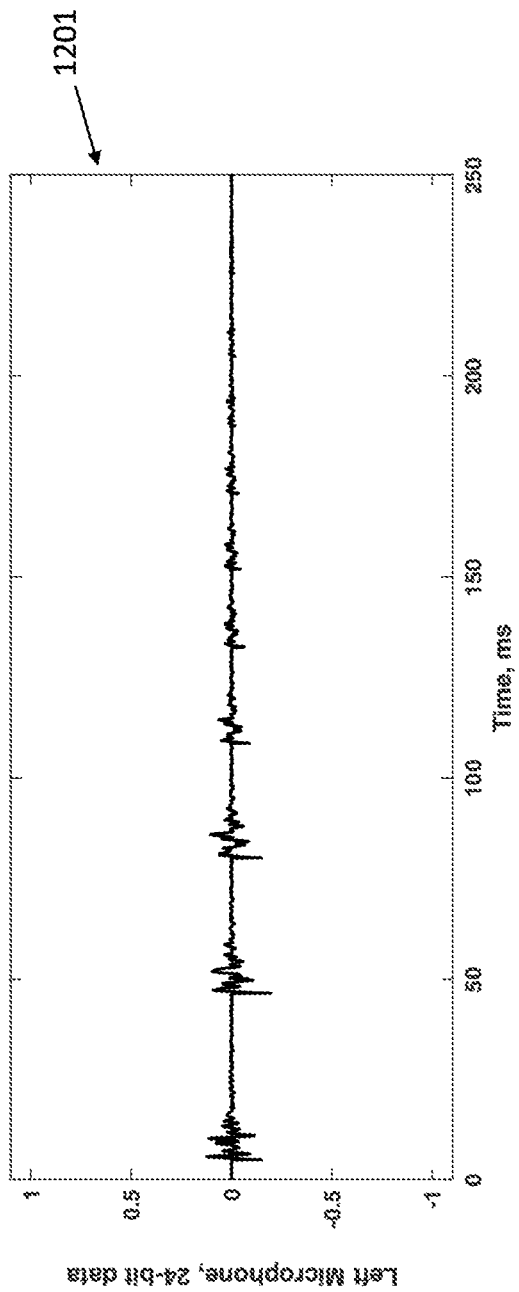
FIG. 12 shows a further example set of waveform diagrams illustrating further example impact waveforms.
Figure 12:
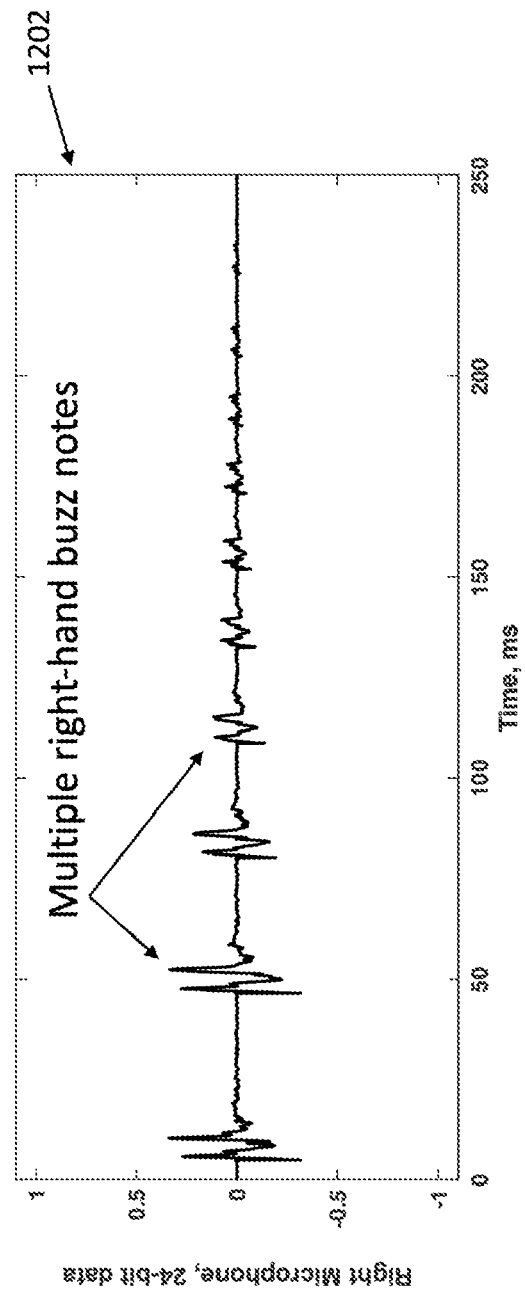

Referring to FIG. 12, there is shown a further set of example impact waveforms 1200.

Impact waveforms 1200 represent example stereo signal waveforms and classification of buzz drumstick hits. The buzz waveform shows a continuous pattern of right-hand drumstick hits. The impact waveforms 1200 show buzz drumstick hits incorporating multiple drumstick hits. In particular, impact waveform 1201 (captured by the left microphone sensor) represents a number of hits, all of which have lower peak amplitude values than corresponding values in impact waveform 1202 (captured by the right microphone sensor). The impact waveforms 1200 are therefore classified as right-hand buzz drumstick hits. As such, examples enable measurement, classification and timing of buzz hits, where drumstick hits are played as multiple hits within a single drumstick hit at a prescribed or indeterminate speed. This enables a drummer's performance accuracy with respect to a chosen rudiment exercise and/or stick pattern incorporating buzz hits to be evaluated.

Figure 13:
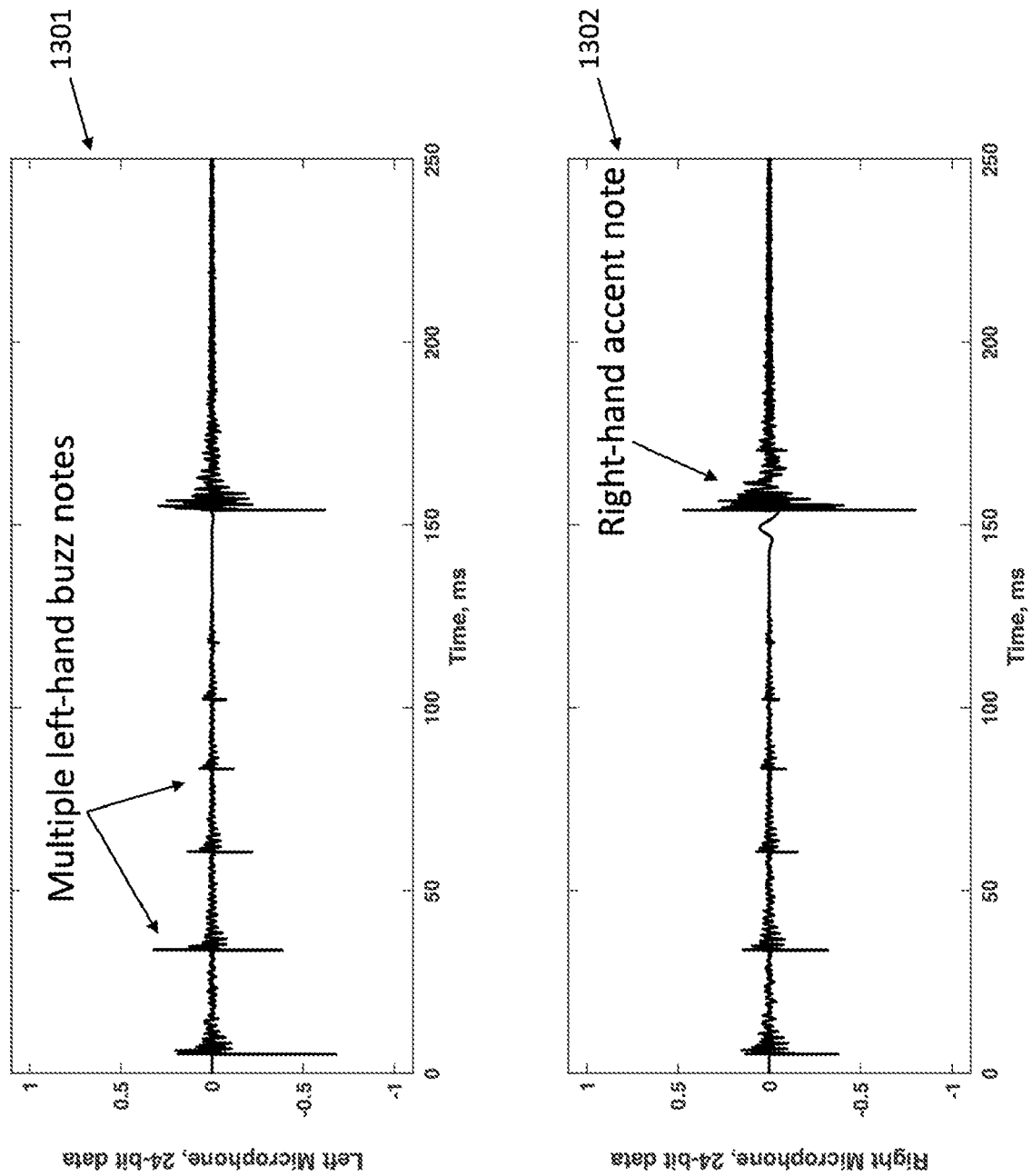
FIG. 13 shows a further example set of waveform diagrams illustrating further example impact waveforms.

Referring to FIG. 13, there is shown a further set of example impact waveforms 1300.

Impact waveforms 1300 represent example stereo signal waveforms and classification of a buzz-flam drumstick hit. A buzz-flam hit waveform has a number of left-hand drumstick hits followed by an accented right-hand hit. Impact waveform 1301 (captured by the left microphone sensor) represents a number of hits, with several of the initial hits being classified as left-hand buzz notes. Impact waveform 1302 (captured by the right microphone sensor) also represents the same hits, with the final hit being classified as a right-hand accent note. In addition, impact waveforms 1301 and 1302 are collectively classified as a buzz-flam drumstick hit. As such, examples enable measurement, classification and analysis of combinations of the drumstick techniques and/or metrics described herein, for example a buzz-flam (sometimes called a "blam").

Examples enable measurement and/or classification of any other drumstick hit type which exhibits unique spatial, temporal, dynamic and/or spectral characteristics.

Figure 14:
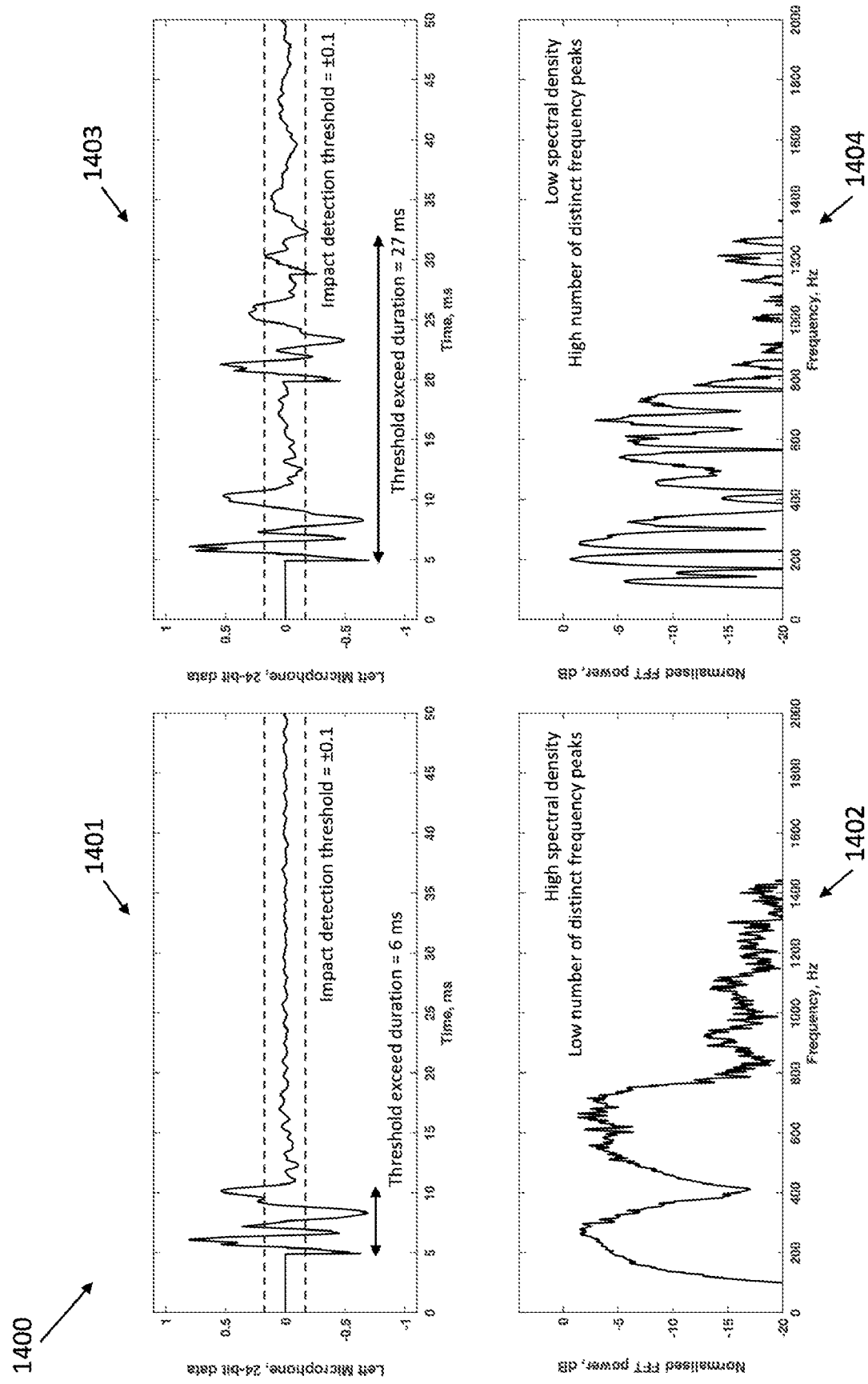
FIG. 14 shows a further example set of waveform diagrams illustrating further example impact waveforms and shows corresponding frequency spectra.

Referring to FIG. 14, there is shown a further set of example impact waveforms and frequency spectra 1400.

Impact waveform 1401 and frequency spectrum 1402 are for a drumstick hit that is allowed to bounce freely away from the performance surface 206. Impact waveform 1403 and frequency spectrum 1404 are for a drumstick hit using a technique which buries the drumstick into the performance surface 206 for a longer contact period. As such, the stick bounce technique metric can be measured from the captured waveforms 1401, 1403. A drumstick hit which is allowed to bounce back freely from the performance surface 206 has an audible difference to the performer and is identified by a shorter duration waveform and a frequency profile with greater spectral density and fewer isolated frequency peaks.

Figure 15:
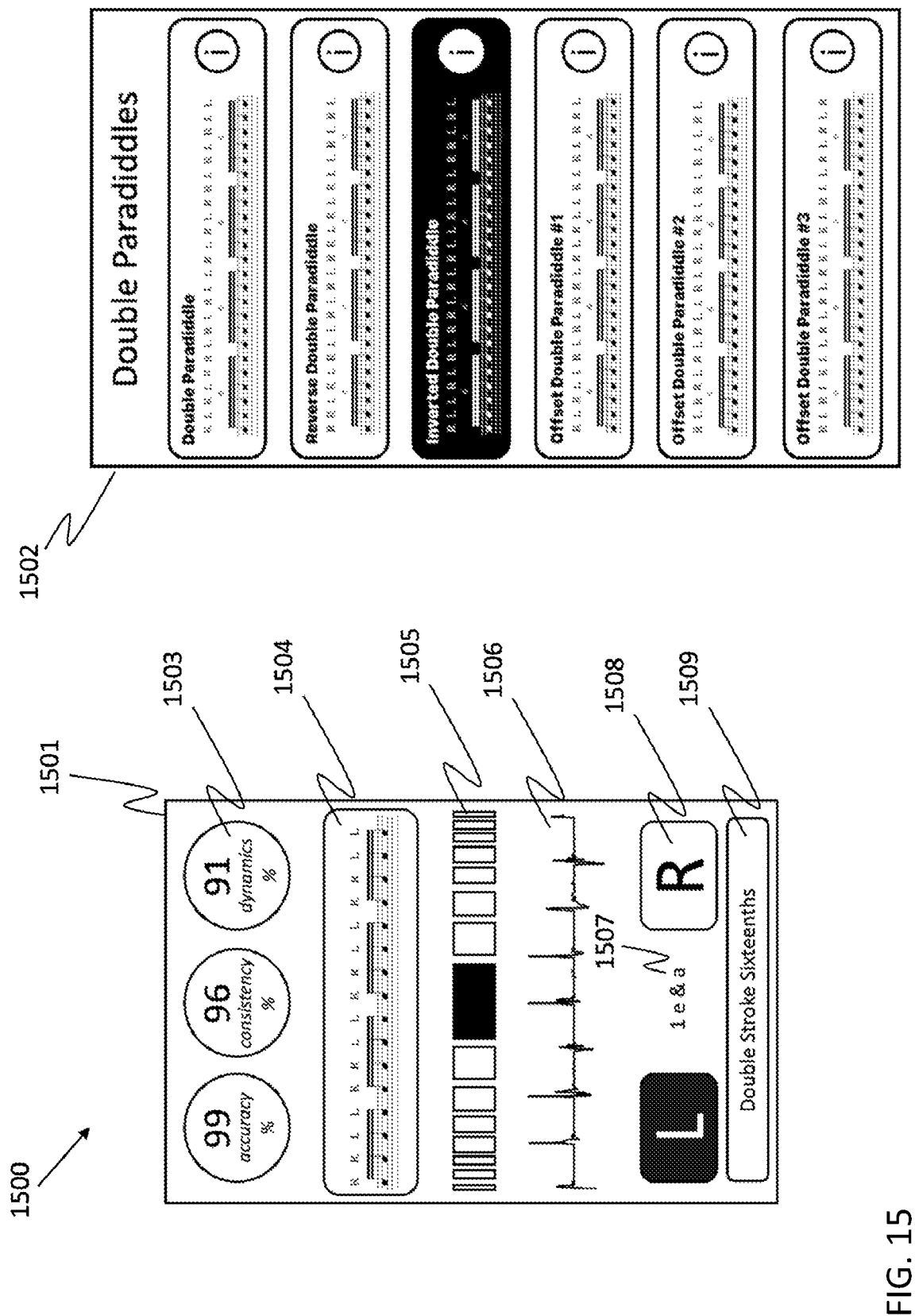
FIG. 15 shows a schematic representation of an example of a graphical user interface.

Referring to FIG. 15, there is shown an example set of graphical user interface screens 1500.

The example graphical user interface screens 1500 include a real-time performance evaluation screen 1501 and an exercise selector menu screen 1502. In this example, the performance evaluation screen 1501 comprises performance scores 1503, music notation of the target exercise and/or the classified performance 1504, an accuracy indicator 1505, sensor readings 1506, a beat counter 1507, left-/right-hand indicators 1508 and an exercise descriptor 1509.

Figure 16:
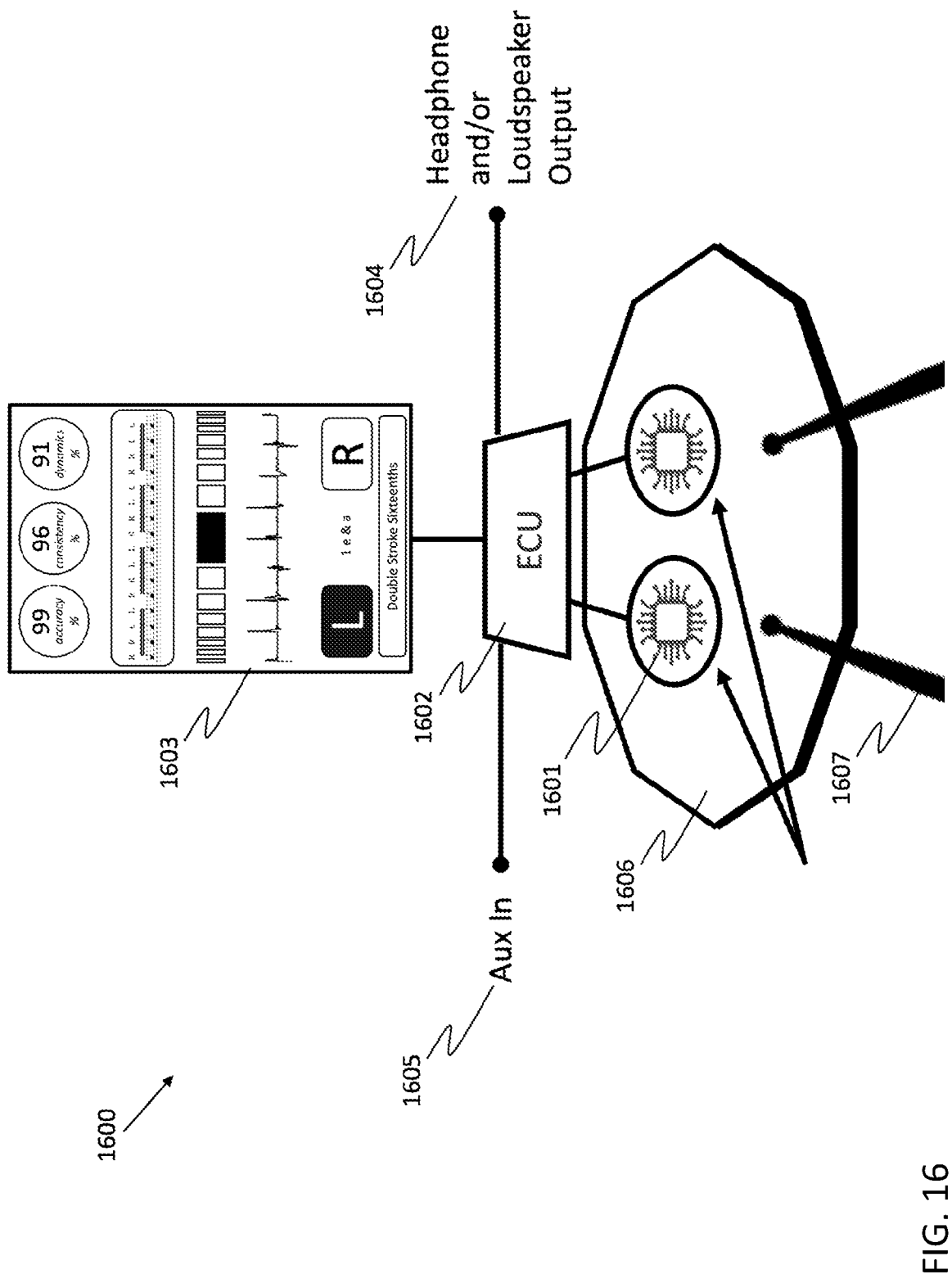
FIG. 16 shows a schematic representation of another example of a system in which percussive performances can be evaluated.

Referring to FIG. 16, there is shown another example of a system 1600.

The system 1600 is similar to the system 200 described above. However, in this example, the sensor(s) 1601 comprise one or more impact sensors. The impact sensor(s) 1601 may comprise one or more accelerometers. An accelerometer enables vibration measurements from within the performance surface 1606 to be gathered. In this example, the one or more impact sensors 1601 are internal to the performance surface 1606. For example, the performance surface 1606 may be a bespoke practice pad and the impact sensor(s) 1601 may be built into the practice pad 1606. In other examples, the one or more impact sensor(s) 1601 are in a retrofit form. This can allow a user to clip on or, in some other way temporarily attach, the sensor(s) 1601 to the performance surface 1606. In other examples, the system 1600 embodies one or more impact sensors 1606 within the impact member or members 1607. For example, one or more impact sensors 1606 may be embodied within the tip of a drumstick 1607 or drumsticks 1607. In contrast to examples above in one or more microphone sensors are used for capturing acoustic data related to one or more drumstick hits on a performance surface, in this example, one or more accelerometers and/or one or more other vibration sensors are used in place of, or in addition to, one or more microphones. In this example, the vibration profile of the performance surface can be measured directly, rather than the acoustic signal generated by a drumstick hit being measured.

Various measures (for example, methods, systems and computer programs) are provided to analyse a percussive performance. Such analysis may involve evaluating the percussive performance. Percussive performance data captured by one or more sensors is received. The percussive performance data represents one or more impact waveforms of one or more hits on one or more performance surfaces. The one or more impact waveforms are analysed. The analysing comprises: (i) identifying one or more characteristics of the one or more hits; (ii) classifying the one or more hits as one or more percussive hit-types based on the one or more characteristics; and (ii) evaluating the one or more characteristics and/or the one or more hit-types against performance target data. Performance analysis data based on the analysis is output. The performance analysis data may comprise performance evaluation data.

Various measures (for example, methods, systems and computer programs) are provided to evaluate a percussive performance. Percussive performance data captured by one or more sensors is received. The percussive performance data represents one or more impact waveforms of one or more hits on a performance surface. The one or more impact waveforms are analysed. The analysing comprises: (i) identifying one or more characteristics of the one or more impact waveforms; (ii) classifying the one or more hits as one or more percussive hit-types based on the one or more characteristics; and (iii) evaluating the one or more percussive hit-types against performance target data. Performance evaluation data based on the evaluating is output.

As such, more comprehensive performance evaluation can be provided than known systems. Known systems are not designed for, or capable of, for example accurate timing analysis of left- and right-hand hits and/or for classification of flams, drag, ruff, buzz or other drumstick hits. Known systems are not developed or optimised to evaluate dynamics within rudiment drumstick exercises and/or to evaluate the contact time of a stick with a drum pad. In contrast, advanced engineering design techniques and signal processing methods can be used in accordance with measures provided herein to gather complex drumstick profiles and extract key metric data from impulse waveforms. Known systems merely measure and respond to the timing of an event. In contrast, measures provided herein provide detailed analysis and measurement of gathered sensor data. Measures provided herein can gather high-resolution impulse waveforms from one or more microphone sensors, which can be used to classify a number of drumstick hit-types. Such measures can use the classification, along with other gathered spatial, temporal, dynamic and/or spectral data to provide objective performance scores to a user.

In some examples, the one or more sensors comprise one or more microphones. This can allow wire-free design between a performance surface (such as a practice pad), an impacting member (such as a drumstick) and the sensor(s), can allow a cheaper, retrofit solution, can allow the use of a standard, passive practice pad and/or performance instruments already on the market. However, in other examples, one or more accelerometers (and/or one or more similar force or pressure sensors) built into the performance surface (for example a practice pad) and/or impacting member (for example drumsticks), and/or one or more clip-on accelerometers retrofitted to a standard performance surface (for example a practice pad) may be used.

In some examples, the one or more sensors comprise a plurality of sensors, the received percussive performance data comprises multichannel sensor data, and the classifying comprises performing positional classification of the one or more hits based on the multichannel sensor data. The multichannel sensor data may comprise stereo sensor data, or sensor data for more than two channels. This can allow differentiation and classification of strokes performed with the left or right hand, and/or another impact member that causes impacts in a precise and exclusive position in space and/or on the performance surface. However, in other examples, classification can be conducted if the performance surface has different materials on different sides (for example, different spectral profiles), and/or if the performer uses different beaters on different sides.

In some examples, the performance evaluation data is output during the percussive performance. This allows a real-time feedback loop while performing. The performer can modify their techniques and see immediate influence of modified technique on performance results. However, in other examples, the performance evaluation data is output after the performance completes.

In some examples, the performance evaluation data comprises performance technique evaluation data representing a measure of similarity of the percussive performance with a benchmark percussive performance. Such examples allow a performer to attempt to mimic the technique of an esteemed and/or respected professional and/or tutor. There are many different drumming techniques used to achieve the same results, for example many drummers hold drumsticks with the matched grip approach in which both sticks are held in a similar manner in each hand with the palms facing downwards, whereas others use the traditional grip, which uses one hand with the palm facing upwards. Neither is wrong or better than the other, but the performer may prefer to consider benchmarks which best suit their preferred style and performance ambitions. However, in other examples, an open-loop feature may be used, where details of good technique are described and measured, but not compared to specific technique benchmarks.

In some examples, the performance evaluation data comprises musical notation data representing the one or more percussive hit-types. Such notation allows the performer to compare their performance visually against target performance data (such as music notation) used during the performance. A percussive performance can also be documented and/or transcribed automatically, allowing time savings in accurately creating music notation of drum-stick and/or other percussion patterns. However, in other examples, such data is not output.

In some examples, the one or more characteristics comprise one or more spectral metrics. As such, a wider body of data to conduct classification and analysis with can be used. However, classification and evaluation conducted without the use of spectral metrics can still yield valuable results.

In some examples, the performance evaluation data comprises performance technique evaluation data and/or performance accuracy evaluation data, and the performance technique evaluation data and/or the performance accuracy evaluation data is based on the one or more spectral metrics. Spectral metrics can enhance the success of the classification routine by allowing more signal features to be used in differentiating between hit-types and, hence, enabling more detailed evaluation. However, in other examples, spectral metrics may just be used for classification and measurement of parameters, and may not be used for technique and/or accuracy evaluation.

In some examples, the one or more impact waveforms comprise a plurality of impact waveforms of a plurality of hits, and the performance evaluation data comprises performance technique evaluation data representing spectral consistency of the plurality of hits. As such, extra technique evaluation can be conducted related to the "sound" or "timbre" (in other words, spectral profile). For example, the performance might be accurate in terms of timing and dynamics, but the left-hand strokes may sound different from the right-hand strokes. Spectral analysis can help identify the difference and advise on what to change to be more consistent. However, in other examples, evaluation of hits without incorporating spectral consistency can still yield valuable results.

In some examples, the one or more characteristics comprise one or more temporal metrics. Temporal metrics enable technique and performance evaluations with respect to different time-based characteristics of the hit(s). However, in other examples, analysis of signal without temporal metrics can still yield valuable results.

In some examples, the performance evaluation data comprises performance technique evaluation data and/or performance accuracy evaluation data, and the performance technique evaluation data and/or the performance accuracy evaluation data is based on the one or more temporal metrics. As such, evaluations can be based on temporal metrics and, hence, more detailed feedback can be provided to the performer. However, in other examples, temporal metrics are used for measurement and/or classification without evaluation taking place.

In some examples, the one or more hits correspond to one or more impacts of one or more impacting members on the performance surface, and the performance evaluation data comprises performance technique evaluation data representing a contact time of each of the one or more hits. Contact time, for example of a drumstick, is a valuable measure to allow technique related to stick bounce to be evaluated. The stick-surface contact time indicates how freely the performer is allowing drumsticks (controlled in the fingers of the performer) to bounce from the surface, as opposed to a more rigid and firm grip of the sticks that results in a longer contact time between the stick and the surface. The firmer grip can cause both injury and limitations on how fast a performer can play accurately. Temporal analysis enables a valuable technique evaluation to be conducted. However, in other examples, technique analysis may be performed which does not incorporate analysis of the stick contact time with a drum pad.

In some examples, the one or more characteristics comprise one or more dynamic metrics. As such, complex dynamic patterns can be evaluated, including accents, flams and drag strokes for example. However, in other examples, analysis without dynamic metrics can still yield valuable results.

In some examples, the performance evaluation data comprises performance technique evaluation data and/or performance accuracy evaluation data, and the performance technique evaluation data and/or the performance accuracy evaluation data is based on the one or more dynamic metrics. This enables complex dynamic patterns to be evaluated, including accents, flams and drag strokes for example. However, in other examples, evaluation without dynamic metrics can still yield valuable results.

In some examples, the one or more impact waveforms comprise a plurality of impact waveforms of a plurality of hits, and the performance evaluation data comprises performance technique evaluation data representing dynamic consistency of the plurality of hits. This enables dynamic constancy to be evaluated for performance and/or technique evaluation, for example to identify that all accent hits are similar in volume, and/or that the left- and right-hand standard hits are consistent with each other. However, in other examples, evaluation without dynamic metrics can still yield valuable results.

In some examples, performance context calibration is performed prior to the analysing, and the analysing is based on calibration data resulting from the performance context calibration. The performance context calibration calibrates for a given performance context. This allows improved classification by calibrating, for example for a specific contact surface, impact member, performance environment and/or any other variable for a given performance context. However, in other examples, factory-set calibration data may be used.

In some examples, the performance context calibration comprises latency calibration, the calibration data comprises latency calibration data, and the latency calibration comprises: (i) causing latency calibration data (for example, audio data) to be output via one or more transducers (for example, one or more loudspeakers); (ii) receiving, in response to the latency calibration data being output via the one or more transducers, data captured by the one or more sensors; and (iii) identifying a temporal latency differential based on a difference between a first time at which the latency calibration data is caused to be output and a second time at which the captured data is received. The latency calibration data is indicative of the temporal latency differential. This allows latency calibration to be performed for any embodiment including different speeds of ECU device, different types of ADC, different types of headphones, to allow for wireless communication between the system components (for example, Bluetooth™ communications between the ECU and the user interface), and/or to allow Bluetooth™ loudspeakers to be used with the system. However, in other examples, factory-set latency data only may be used, with a trade-off of reduced performance for system implementations which deviates from the core system.

In some examples, the performance context calibration comprises dynamics calibration, the calibration data comprises dynamics calibration data, and the dynamics calibration comprises: (i) receiving dynamics calibration performance data captured by the one or more sensors, the dynamics calibration performance data representing at least one impact waveform of at least one calibration hit of a first percussive hit-type and at least one impact waveform of at least one calibration hit of a second, different percussive hit-type; and (ii) identifying a first dynamics threshold that enables one or more performance hits to be classified as either the first percussive hit-type or second percussive hit-type by comparing one or more dynamic metrics based on one or more impact waveforms of the one or more performance hits against the first dynamics threshold. The dynamics calibration data is indicative of the first dynamics threshold. This enables one or more dynamic thresholds to be set dependent, for example, on the type of impact member and/or or performance surface, and/or or for the specific techniques of a user. For example, an accent hit may have a different volume dependent on the performer and their setup. A performer who hits hard on a hard, rigid drum pad may use different threshold settings from someone who performs with less powerful hits on a rubber-coated type of drum pad. However, in other examples, factory-set dynamics data only is used, with a trade-off of reduced performance for system implementations which deviates from the core system.

In some examples, the dynamics calibration performance data represents at least one impact waveform of at least one calibration hit of at least one further percussive hit-type and the dynamics calibration comprises: (i) identifying at least one further dynamics threshold that enables the one or more performance hits to be classified as the at least one further percussive hit-type by comparing the one or more dynamic metrics based on the one or more impact waveforms of the one or more performance hits against the at least one further dynamics threshold. The dynamics calibration data is indicative of the at least one further dynamics threshold. This allows a plurality of thresholds to be set for distinguishing between, for example, ghost, standard and accent notes, and/or any number of granular divisions relevant to a percussive performance. For example, this may enable classification between pianissimo, piano, mezzo-piano, forte and fortissimo dynamics. However, in other examples, a single calibration threshold may be used to enable one level of classification, which can still be valuable for analysis.

In some examples, the performance context calibration comprises percussive hit-type calibration, the calibration data comprises percussive hit-type calibration data, and the percussive hit-type calibration comprises: (i) receiving percussive hit-type calibration performance data captured by the one or more sensors, the percussive hit-type calibration performance data representing at least one impact waveform of at least one calibration hit of at least one given percussive hit-type. The percussive hit-type calibration data comprises data derived from the at least one impact waveform of the at least one calibration hit of the at least one given percussive hit-type. This allows a user to play example versions of each hit-type and enables a more bespoke classification (for example, by feature thresholds of machine learning) system to be implemented with respect to the particular performer and their setup. However, in other examples, factory-set data for enabling classification can be used.

In some examples, the one or more impact waveforms comprise two or more impact waveforms of two or more hits respectively, and the classifying comprises: (i) classifying the two or more hits; and (ii) classifying, based on the classification of the two or more hits, a hit sequence comprising the two or more hits as a different percussive hit-type from percussive hit-types of the two or more hits. This allows complex combinations of hits to be evaluated. For example, a single drag-tap hit sequence incorporates two consecutive ghost hits in one hand followed by a standard single note in the other hand, followed by an accent in the original hand. However, in other examples, classification of single hits only is performed.

In some examples, the performance target data represents one or more historic percussive performances. This allows a user to track their performance progress over time and/and perform against their own prior benchmark. However, in other examples, implementation without access to historic performance data can still be valuable.

In some examples, data representing the performance target data is output before and/or during the percussive performance. This allows the performance target data to modify during the performance, for example for an exercise with a pattern that speeds up. This also enables an indicator to be provided to the user which shows which hit-type should be played in which hand on the next, upcoming, beat. However, in other examples, performance target data is not output to the performer. For example, the performer may follow a performance target in a workbook.

In some examples, the one or more percussive hit-types comprise one or more drumming hit-types. This allows analysis and evaluation for a drummer with respect to established performance target data, such as the key drum rudiments defined by the Percussive Arts Society. However, in other examples, the one or more percussive hit-types can be of one or more different types, for example for a xylophone and/or a glockenspiel.

In some examples, the identifying comprises: (i) calculating one or more waveform metrics based on the one or more impact waveforms; and/or (ii) extracting one or more features from the one or more impact waveforms. As such, different characteristics and techniques for identifying the same may be used. This provides flexibility in how the percussive performance is evaluated and can also provide more comprehensive evaluation. In addition, such metrics and/or features enable highly accurate and robust classification and allow purely machine learnt classification. However, in other examples, one or more different types of characteristic could be identified and/or one or more different characteristic identification techniques may be used. For example, a curve matching algorithm may be used to compare waveform shape characteristics and apply, for example, a least squares analysis for differentiating between hit-types.

In some examples, the one or more characteristics are evaluated against the performance target data. This allows a more quantitative evaluation of the classified hit(s). For example, a hit may be classified as a flam and evaluated to be the correct hit-type in a target exercise. With the characteristic(s) also evaluated, flams can be evaluated for how accurate and consistent they are as flams, to check they have the same dynamics, timing and spectral characteristics every time, etc. In addition, technique evaluation for, and qualitative advice for improving, the flams can be offered. However, valuable evaluation may still be performed without additional characteristic evaluation. For example, it could be checked that the correct hit-types were played in the correct sequence, but without finer evaluation of whether those correct hits were accurate in time with a reference metronome, and/or relative to each other, or that they we consistently performed in terms of temporal, dynamic and spectral characteristics.

The above embodiments are to be understood as illustrative examples. Further embodiments are envisaged.

In examples described above, multiple sensors are used. In some examples, only a single sensor (for example, microphone) is used. However, this may enable less accurate metrics to be gathered with respect to the spatial classification of which hand is responsible for which hit.

Examples have been described above in which the system comprises a sensor in a single location. In some examples, a plurality of input sensors in different locations can be used. This can create a more elaborate performance analysis system, for example to incorporate analysis of a kick drum pedal and/or a user's hi-hat foot technique. As such, in some examples, a plurality of input sensors is used to create a more detailed performance analysis system.

In examples described above, a bespoke system is provided. In other examples, a host smartphone, tablet or desktop computer provides the sensing ECU and UI for capture, analysis and display of hit. Peripheral devices for such devices may also make up some elements of the system. For example, an external stereo microphone can be connected to a smartphone handset. As such, in some examples, a smartphone and/or other portable electronic device and/or host computer having some or all of the components of the system described herein is used.

Examples have been described above in which the sensor(s) comprises a stereo microphone and the percussive performance data comprises one or more acoustic profiles. However, the percussive performance data may comprise one or more vibration profiles, for example where the sensor(s) comprises one or more accelerometers. As such, the percussive performance data can relate to one or more acoustic and/or vibration characteristics of a percussive performance of one or more impacting members being used to impact and excite a performance surface. In general, the sensor(s) can comprise one or more sensors of a type other than a microphone. For, example the sensor(s) may comprise one or more accelerometers, one or more transducers and/or one or more similar sensors.

A number of different naming conventions and terminologies are used for classifying drumstick hits in different communities and for different music genres. Examples described herein can classify any type of drumstick hit and/or drumstick hit sequence which has unique spatial, temporal, dynamic and/or spectral characteristics, regardless of the naming convention used.

Examples have been described above in which the percussive performance is a drumming performance. Other of percussive performances include, but are not limited to, timpani performances, glockenspiel performances and xylophone performances.

Examples have been described above in which the performer is a drummer. However, other types of performer are envisaged depending, for example, on the nature of the percussive performance.

Examples have been described above in which the one or more hits are one or more drumstick hits from a performer using a pair of drumsticks as impacting members. However, the one or more hits may be of another type. Other examples of impacting members (which may be referred to as "performance implements", "percussive devices", or the like) include, but are not limited to, mallets, beaters (which may also be referred to as "drum beaters"), hot rods, brushes, parts of the human body (such as human hands), etc. In addition, different drumsticks may be made of different drumstick materials.

Examples have been described above in which the performance surface is a drumming practice pad. Other examples of performance surfaces include, but are not limited to, drumheads, xylophones, glockenspiels, timpani, tambourines, musical instruments, table tops, cushions and parts of the human body (such as human legs). Other types of audible and/or vibratile performance surface may, however, be used.

Examples have been described above in which an impact waveform as classified as a drumstick hit-type. A hit-type could, alternatively, be identified as, for example, a timpani, glockenspiel or xylophone hit with a stick, beater or mallet, or tambourine hit on the palm of a hand.

The positional classification described above may be extended further to classify the hit(s) as being from more complex typologies. Such typologies include, but are not limited to, left and right feet and different types of impacting member.

In the context of drumstick hits, the hit-type classification algorithm may similarly identify and classify single strokes, double strokes, drag strokes, ruff strokes, buzz strokes, rim shots and/or other uniquely identifiable percussion hits and combinations of hits led by either the left or right hand.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of evaluating a percussive performance, the method comprising:
   receiving percussive performance data captured by one or more sensors, the percussive performance data representing one or more impact waveforms of a plurality of hits on one or more performance surfaces;
   analyzing the one or more impact waveforms, wherein the analyzing comprises:
      identifying one or more characteristics of the one or more impact waveforms, wherein the one or more characteristics comprise one or more spectral metrics, one or more dynamic metrics and/or one or more temporal metrics; and
   outputting performance evaluation data,
   wherein the performance evaluation data is based on the one or more spectral metrics, the one or more dynamic metrics and/or the one or more temporal metrics, and
   wherein the performance evaluation data represents spectral consistency of the plurality of hits, dynamic consistency of the plurality of hits and/or temporal consistency of the plurality of hits.

2. The method of claim 1, wherein the performance evaluation data is output during the percussive performance.

3. The method of claim 1, wherein the performance evaluation data represents a measure of similarity of the percussive performance with a benchmark percussive performance.

4. The method of claim 1, wherein one or more of the plurality of hits corresponds to one or more impacts of one or more impacting members on the one or more performance surfaces, and wherein the performance evaluation data represents a contact time of each of the one or more of the plurality of hits.

5. The method of claim 1, comprising performing performance context calibration prior to said analyzing, wherein said analyzing is based on calibration data resulting from said performance context calibration.

6. The method of claim 5, wherein said performance context calibration comprises latency calibration, wherein said calibration data comprises latency calibration data, and wherein said latency calibration comprises:
causing latency calibration data to be output via one or more transducers;
receiving, in response to the latency calibration data being output via the one or more transducers, data captured by the one or more sensors; and
identifying a temporal latency differential based on a difference between a first time at which the latency calibration data is caused to be output and a second time at which the captured data is received,
wherein the latency calibration data is indicative of the temporal latency differential.

7. The method of claim 5, wherein said performance context calibration comprises dynamics calibration, wherein said calibration data comprises dynamics calibration data, and wherein said dynamics calibration comprises:
receiving dynamics calibration performance data captured by the one or more sensors, the dynamics calibration performance data representing at least one impact waveform of at least one calibration hit of a first percussive hit-type and at least one impact waveform of at least one calibration hit of a second, different percussive hit-type; and
identifying a first dynamics threshold that enables one or more performance hits to be classified as either the first percussive hit-type or second percussive hit-type by comparing one or more dynamic metrics based on one or more impact waveforms of the one or more performance hits against the first dynamics threshold,
wherein the dynamics calibration data is indicative of the first dynamics threshold.

8. The method of claim 7, wherein the dynamics calibration performance data represents at least one impact waveform of at least one calibration hit of at least one further percussive hit-type and wherein said dynamics calibration comprises:
identifying at least one further dynamics threshold that enables the one or more performance hits to be classified as the at least one further percussive hit-type by comparing the one or more dynamic metrics based on the one or more impact waveforms of the one or more performance hits against the at least one further dynamics threshold,
wherein the dynamics calibration data is indicative of the at least one further dynamics threshold.

9. The method of claim 5, wherein said performance context calibration comprises percussive hit-type calibration, wherein said calibration data comprises percussive hit-type calibration data, and wherein said percussive hit-type calibration comprises:
receiving percussive hit-type calibration performance data captured by the one or more sensors, the percussive hit-type calibration performance data representing at least one impact waveform of at least one calibration hit of at least one given percussive hit-type,
wherein the percussive hit-type calibration data comprises data derived from the at least one impact waveform of the at least one calibration hit of the at least one given percussive hit-type.

10. The method of claim 1, wherein the one or more impact waveforms comprise two or more impact waveforms of the plurality of hits, and wherein said classifying comprises:
classifying the plurality of hits; and
classifying, based on the classification of the plurality of hits, a hit sequence comprising the plurality of hits as a different percussive hit-type from percussive hit-types of the plurality of hits.

11. The method of claim 1, wherein said identifying comprises:
calculating one or more waveform metrics based on the one or more impact waveforms; and/or
extracting one or more features from the one or more impact waveforms.

12. The method of claim 10, wherein the one or more impact waveforms comprise two or more impact waveforms of the plurality of hits, and wherein said classifying comprises:
classifying the plurality of hits; and
classifying, based on the classification of the plurality of hits, a hit sequence comprising the plurality of hits as a different percussive hit-type from percussive hit-types of the plurality of hits.

13. The method of claim 12, wherein the one or more sensors comprise a plurality of sensors, wherein the received percussive performance data comprises multichannel sensor data, and wherein said classifying comprises performing positional classification of the one or more of the plurality of hits based on the multichannel sensor data.

14. The method of claim 13, wherein the positional classification identifies whether a left or right hand of a performer was responsible for at least one given hit of the one or more of the plurality of hits.

15. The method of claim 12, wherein the performance target data represents one or more historic percussive performances.

16. The method of claim 12, wherein the performance evaluation data comprises musical notation data representing the one or more percussive hit-types.

17. A system configured to perform a method of evaluating a percussive performance, the method comprising:
receiving percussive performance data captured by one or more sensors, the percussive performance data representing one or more impact waveforms of a plurality of hits on one or more performance surfaces;
analyzing the one or more impact waveforms, wherein the analyzing comprises:
identifying one or more characteristics of the one or more impact waveforms, wherein the one or more characteristics comprise one or more spectral metrics, one or more dynamic metrics and/or one or more temporal metrics; and
outputting performance evaluation data, wherein the performance evaluation data is based on the one or more spectral metrics, the one or more dynamic metrics and/or the one or more temporal metrics, and wherein the performance evaluation data represents spectral consistency of the plurality of hits, dynamic consistency of the plurality of hits and/or temporal consistency of the plurality of hits.

18. A non-transitory computer readable medium storing instructions, which when performed on one or more processors, perform a method of evaluating a percussive performance, the method comprising:

receiving percussive performance data captured by one or more sensors, the percussive performance data representing one or more impact waveforms of a plurality of hits on one or more performance surfaces;

analyzing the one or more impact waveforms, wherein the analyzing comprises:

identifying one or more characteristics of the one or more impact waveforms, wherein the one or more characteristics comprise one or more spectral metrics, one or more dynamic metrics and/or one or more temporal metrics; and outputting performance evaluation data, wherein the performance evaluation data is based on the one or more spectral metrics, the one or more dynamic metrics and/or the one or more temporal metrics, and wherein the performance evaluation data represents spectral consistency of the plurality of hits, dynamic consistency of the plurality of hits and/or temporal consistency of the plurality of hits.

19. A method of evaluating a percussive performance, the method comprising:

receiving percussive performance data captured by one or more sensors, the percussive performance data representing one or more impact waveforms of a plurality of hits on one or more performance surfaces;

analyzing the one or more impact waveforms, wherein the analyzing comprises:

evaluating spectral, dynamic and/or temporal consistency of the plurality of hits; and outputting performance evaluation data based on said evaluating.

20. A method of evaluating a percussive performance, the method comprising:

receiving percussive performance data captured by one or more sensors, the percussive performance data representing one or more impact waveforms of one or more hits on a performance surface;

analyzing the one or more impact waveforms, wherein the analyzing comprises:

identifying one or more characteristics of the one or more impact waveforms;

classifying the one or more hits as one or more percussive hit-types based on the one or more characteristics; and evaluating the one or more percussive hit-types against performance target data; and outputting performance evaluation data based on said evaluating, wherein the method comprises performing performance context calibration prior to said analyzing, wherein said analyzing is based on calibration data resulting from said performance context calibration, wherein said performance context calibration comprises dynamics calibration, wherein said calibration data comprises dynamics calibration data, and wherein said dynamics calibration comprises:

receiving dynamics calibration performance data captured by the one or more sensors, the dynamics calibration performance data representing at least one impact waveform of at least one calibration hit of a first percussive hit-type and at least one impact waveform of at least one calibration hit of a second, different percussive hit-type; and identifying a first dynamics threshold that enables one or more performance hits to be classified as either the first percussive hit-type or second percussive hit-type by comparing one or more dynamic metrics based on one or more impact waveforms of the one or more performance hits against the first dynamics threshold, wherein the dynamics calibration data is indicative of the first dynamics threshold.

* * * * *